United States Patent
Kim et al.

(10) Patent No.: US 10,326,961 B2
(45) Date of Patent: Jun. 18, 2019

(54) PROJECTION APPARATUS AND OPERATING METHOD THEREOF

(71) Applicant: SAMSUNG ELECTRONICS CO., LTD., Suwon-si (KR)

(72) Inventors: Jung-Hyung Kim, Yongin-si (KR);
Hee-kyung Kim, Seongnam-si (KR);
Jung-chul Park, Yongin-si (KR);
Se-jun Song, Seongnam-si (KR);
Sung-kwang Yang, Yongin-si (KR);
Yoon-gi Lee, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 226 days.

(21) Appl. No.: 15/215,697

(22) Filed: Jul. 21, 2016

(65) Prior Publication Data
US 2017/0026607 A1    Jan. 26, 2017

(30) Foreign Application Priority Data
Jul. 22, 2015 (KR) ........................ 10-2015-0103997

(51) Int. Cl.
*H04N 5/63* (2006.01)
*H04N 9/31* (2006.01)
(Continued)

(52) U.S. Cl.
CPC ............. *H04N 5/63* (2013.01); *H04N 9/3173* (2013.01); *H04N 9/3194* (2013.01); *H04N 21/4122* (2013.01); *H04N 21/42202* (2013.01)

(58) Field of Classification Search
CPC .. H04N 9/3173; H04N 9/3194; H04N 9/3155; H04N 5/4403; H04N 5/63;
(Continued)

(56) References Cited

U.S. PATENT DOCUMENTS

| | | | |
|---|---|---|---|
| 6,443,574 B1 * | 9/2002 | Howell | B60R 11/0229 345/649 |
| 8,016,433 B2 | 9/2011 | Shirasu et al. | |

(Continued)

FOREIGN PATENT DOCUMENTS

WO    2014/195561 A1    12/2014

OTHER PUBLICATIONS

Communication dated Sep. 1, 2016 issued by the International Searching Authority in counterpart International Application No. PCT/KR2016/006083 (PCT/ISA/220/210/237).

*Primary Examiner* — Cara E Rakowski
*Assistant Examiner* — Christopher A Lamb, II
(74) *Attorney, Agent, or Firm* — Sughrue Mion, PLLC

(57) ABSTRACT

An electronic device includes a projector, an operating method of an electronic device including a projector, and a non-transitory computer-readable recording medium having recorded thereon instructions for performing the operating method. The electronic device includes a communicator configured to exchange data with an external device, a projector configured to project light; a sensor configured to measure a degree of proximity between the electronic device and an installation surface on which the electronic device is to be installed, and a controller configured to control the communicator and/or the projector based on the degree of proximity measured by the sensor.

12 Claims, 28 Drawing Sheets

(51) Int. Cl.
*H04N 21/41* (2011.01)
*H04N 21/422* (2011.01)

(58) Field of Classification Search
CPC ......... H04N 2005/4428; H04N 9/3185; G03B 21/28; G03B 21/10; G03B 21/145; G03B 21/14; G03B 21/142; G03B 21/147; G03B 21/2053; G03B 21/2066; G03B 21/30
See application file for complete search history.

(56) References Cited

U.S. PATENT DOCUMENTS

| | | | |
|---|---|---|---|
| 8,666,446 | B2 | 3/2014 | Kim |
| 2007/0247599 | A1* | 10/2007 | Kadowaki .............. F16M 11/28 353/101 |
| 2009/0036158 | A1 | 2/2009 | Fujinawa et al. |
| 2010/0053591 | A1 | 3/2010 | Gibson et al. |
| 2010/0099457 | A1 | 4/2010 | Kim |
| 2011/0128155 | A1 | 6/2011 | Hsieh |
| 2011/0261405 | A1 | 10/2011 | Ito et al. |
| 2014/0071300 | A1* | 3/2014 | Chen ................. H04N 1/00267 348/207.1 |
| 2014/0160446 | A1 | 6/2014 | Kumamoto |
| 2014/0176918 | A1 | 6/2014 | Ozawa et al. |
| 2014/0247288 | A1 | 9/2014 | Zhang |
| 2014/0285778 | A1* | 9/2014 | Inoue ................... H04N 9/3185 353/70 |
| 2016/0283087 | A1* | 9/2016 | Nishimura .......... G06F 3/04845 |
| 2016/0295185 | A1* | 10/2016 | Mima ...................... G09G 5/36 |

\* cited by examiner

FIG. 11

|  | Stage 1 | Stage 2 | Stage 3 | Stage 4 |
|---|---|---|---|---|
| CONNECTION STATE | CONNECTED | CONNECTED | CONNECTED | DISCONNECTED |
| DATA TRANSMISSION STATE | TRANSMITTING | TRANSMITTING | STOP TRANSMITTING | STOP TRANSMITTING |
| PROJECTION MODULE STATE | On | On | Off | Off |
| OPTICAL MODULE STATE | On | Off | Off | Off |

FIG. 13

|  | Stage 4 | Stage 3 | Stage 2 | Stage 1 |
|---|---|---|---|---|
| CONNECTION STATE | RE-CONNECTION REQUEST | CONNECTED | CONNECTED | CONNECTED |
| DATA TRANSMISSION STATE | STOP TRANSMITTING | STOP TRANSMITTING | TRANSMITTING | TRANSMITTING |
| PROJECTION MODULE STATE | Off | Off | On | On |
| OPTICAL MODULE STATE | Off | Off | Off | On |

FIG. 15A
FIG. 15B
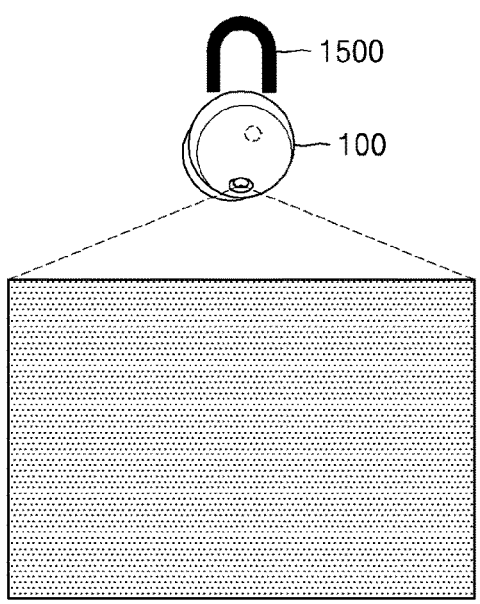
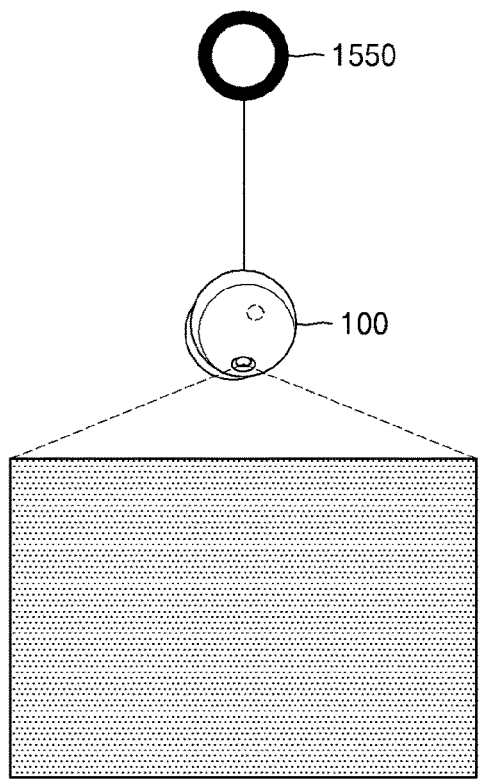

FIG. 19

| | Stage 1 (0°~25°) | Stage 2 (25°~50°) | Stage 3 (50°~90°) | Stage 4 (90°) |
|---|---|---|---|---|
| CONNECTION STATE | RE-CONNECTION REQUEST | CONNECTED | CONNECTED | CONNECTED |
| DATA TRANSMISSION STATE | STOP TRANSMITTING | REQUEST TO RESUME TRANSMITTING | TRANSMITTING | TRANSMITTING |
| PROJECTION MODULE STATE | Off | Off | On | On |
| OPTICAL MODULE STATE | Off | Off | Off | On |

FIG. 21

| | Stage 4<br>(0°~25°) | Stage 3<br>(25°~50°) | Stage 2<br>(50°~90°) | Stage 1<br>(DEGREE OF BENDING 90°) |
|---|---|---|---|---|
| CONNECTION STATE | RE-CONNECTION REQUEST | CONNECTED | CONNECTED | CONNECTED |
| DATA TRANSMISSION STATE | STOP TRANSMITTING | REQUEST TO RESUME TRANSMITTING | TRANSMITTING | REQUEST TO RESUME TRANSMITTING |
| PROJECTION MODULE STATE | Off | Off | On | On |
| OPTICAL MODULE STATE | Off | Off | Off | On |

FIG. 23

| | Stage 4 | Stage 3 | Stage 2 | Stage 1<br>(DEGREE OF BENDING 0°) | Stage 0<br>(DEGREE OF BENDING 90°) |
|---|---|---|---|---|---|
| CONNECTION STATE | RE-CONNECTION REQUEST | CONNECTED | CONNECTED | CONNECTED | CONNECTED |
| DATA TRANSMISSION STATE | STOP TRANSMITTING | REQUEST TO RESUME TRANSMITTING | TRANSMITTING | REQUEST TO RESUME TRANSMITTING | REQUEST TO RESUME TRANSMITTING OR TRANSMITTING |
| PROJECTION MODULE STATE | Off | Off | On | On | On |
| OPTICAL MODULE STATE | Off | Off | Off | Off | On |
| LED LIGHT STATE | Off | Off | Off | On | Off |

PROJECTION APPARATUS AND OPERATING METHOD THEREOF

CROSS-REFERENCE TO RELATED APPLICATION

This application claims priority from Korean Patent Application No. 10-2015-0103997, filed on Jul. 22, 2015, in the Korean Intellectual Property Office, the disclosure of which is incorporated herein in its entirety by reference.

BACKGROUND

1. Field

Apparatuses and methods consistent with exemplary embodiments relate to an electronic device and an operating method thereof, and more particularly, to an electronic device including a projector and an operating method thereof.

2. Description of the Related Art

A projector or a projection system is a display device that displays an image by projecting the image onto a surface such as a projection screen using light emitted from a light source such as, for example, a light emitting diode (LED) or a lamp. Such a display device may be used for conference room presentations, motion picture projection, home theaters, or the like.

Typically, a lamp with high luminosity may be used to obtain a clear image. A lamp with high luminosity, however, may also cause significant power consumption.

A wired/wireless communication module of a projector may receive image content and process image/voice data. Processing a large amount of data may also require a large amount of data calculation, and unnecessary data processing may increase power consumption. For a small portable projector, for example, play time may be considered just as important a factor as portability. Thus, there exists a need for an efficient power management scheme for projectors.

SUMMARY

One or more exemplary embodiments provide an electronic device configured to control power of an element of an electronic device according to a degree of proximity between the electronic device and an installation plane in order to reduce electric current consumption and an operating method thereof.

According to an aspect of an exemplary embodiment, an electronic device includes a communicator configured to exchange data with an external device, a projector configured to project light, a sensor configured to measure a degree of proximity between the electronic device and an installation surface on which the electronic device is installed, and a controller configured to control at least one of the communicator and the projector based on the degree of proximity measured by the sensor.

The installation surface may be identical or parallel to a projection surface onto which the light is to be projected from the projector. The controller may be further configured to control at least one of (i) a connection state between the communication module and the external device, (ii) a data transmission and reception state between the communication module and the external device, and (iii) power supplied to the projector.

The controller may perform at least one of a first operation of controlling at least one of the connection state and the data transmission and reception state in response to the degree of proximity being in a first range, a second operation of controlling power supplied to an electronic circuit included in the projector in response to the degree of proximity being in a second range, and a third operation of controlling power supplied to an optical module included in the projector in response to the degree of proximity being in a third range.

While the electronic device approaches the installation surface, the controller may (i) control the communicator to send a request to reconnect to the external device and/or control the communicator to send a request to resume transmitting data to the external device according to the first operation, (ii) control a power supply source to supply power to the electronic circuit of the projector according to the second operation, and (iii) control the power supply source to supply power to the optical module of the projector according to the third operation.

The controller may control the communicator to send the request to reconnect to the external device according to the first operation when a duration that the electronic device maintains the degree of proximity within the first range is less than a threshold, and control the communicator to send the request to resume transmitting data to the external device when the duration that the electronic device maintains the degree of proximity within the first range is greater than or equal to the threshold.

While the electronic device recedes from the installation surface, the controller may control a power supply source to stop supplying power to the optical module included in the projector according to the third operation, control the power supply source to stop supplying power to the projector according to the second operation, and control the communicator to send a request to disconnect from the external device and/or control the communication module to send a request to stop transmitting data to the external device according to the first operation.

The controller may control the communicator to send the request to stop transmitting data to the external device according to the first operation when a duration that the electronic device maintains the degree of proximity within the first range is less than a threshold, and control the communicator to send the request to disconnect from the external device when the duration that the electronic device maintains the degree of proximity within the first range is greater than or equal to the threshold.

The second range may be greater than the first range, and the third range may be greater than the second range.

The electronic device may further include another sensor configured to measure whether the electronic device is installed on the installation surface. The controller may control at least one of the communicator and the projector based on the degree of proximity which is measured by the sensor or information regarding whether the electronic device is installed which is measured by the other sensor.

The controller may sequentially control at least one of a connection state between the communicator and the external device, a data transmission and reception state between the communicator and the external device, and power supplied to an optical module based on the degree of proximity or the information regarding whether the electronic device is installed on the installation surface.

The controller may perform at least one of a first operation of controlling the connection state and/or controlling the data transmission and reception state in response to the degree of proximity being within a first range or in response to a duration for which the electronic device maintains the degree of proximity within the first range, a second operation of controlling power supplied to an electronic circuit included in the projector in response to the degree of proximity being in a second range, and a third operation of controlling power supplied to the optical module included in the projector in response to the degree of proximity being in a third range or in response to the information regarding whether the electronic device is installed on the installation surface.

The second range may be greater than the first range, and the third range may be greater than the second range.

The information regarding whether the electronic device is installed on the installation surface may include information indicating whether the electronic device is attached to the installation surface, connected to the installation surface, or installed at a structure for positioning the electronic device on the installation plane.

The electronic device may further include another sensor configured to measure an angle between the electronic device and an attachment member of the electronic device. The attachment member may secure the electronic device to the installation surface. The controller may control at least one of the communicator and the projector based on the degree of proximity measured by the sensor or the angle measured by the other sensor.

According to an aspect of another exemplary embodiment, an operating method of an electronic device includes measuring a degree of proximity between the electronic device and an installation surface on which the electronic device is installed, and, based on the degree of proximity measured by a sensor, controlling at least one of a communicator configured to exchange data with an external device and a projector configured to project light.

The installation surface may be identical or parallel to a projection surface onto which the light is to be projected from the projector.

The controlling may include controlling at least one of (i) a connection state between the communicator and the external device, (ii) a data transmission and reception state between the communicator and the external device, and (iii) power supplied to the projector.

The controlling may further include a first operation of controlling at least one of the connection state and the data transmission and reception state in response to the degree of proximity being in a first range, a second operation of controlling power supplied to an electronic circuit included in the projector in response to the degree of proximity being in a second range greater than the first range, and a third operation of controlling power supplied to an optical module included in the projector in response to the degree of proximity being in a third range greater than the second range.

The controlling may further include, while the electronic device approaches the installation surface, reconnecting to the external device and/or resuming transmission of data to the external device according to the first operation, supplying power to the electronic circuit of the projector according to the second operation, and supplying power to the optical module of the projector according to the third operation.

BRIEF DESCRIPTION OF THE DRAWINGS

The above and/or other aspects will become apparent and more readily appreciated from the following description of the embodiments, taken in conjunction with the accompanying drawings in which:

FIG. 11 shows exemplary operation states of an electronic device at various stages as the electronic device recedes from an installation surface;

FIG. 13 shows exemplary operation states of an electronic device at various stages as the electronic device approaches an installation surface;

FIGS. 15A and 15B are diagrams showing a mount for installing an electronic device;

FIG. 19 is a reference diagram showing element control states for exemplary stages in an operation of controlling an element of an electronic device according to an angle between the electronic device and an attachment member of the electronic device;

FIG. 21 is a reference diagram showing various stages according to an exemplary operation;

FIG. 23 shows various states for each exemplary stage of an electronic device according to a degree of proximity of the electronic device with a projection function and an illumination function.

DETAILED DESCRIPTION

Figure 1A:
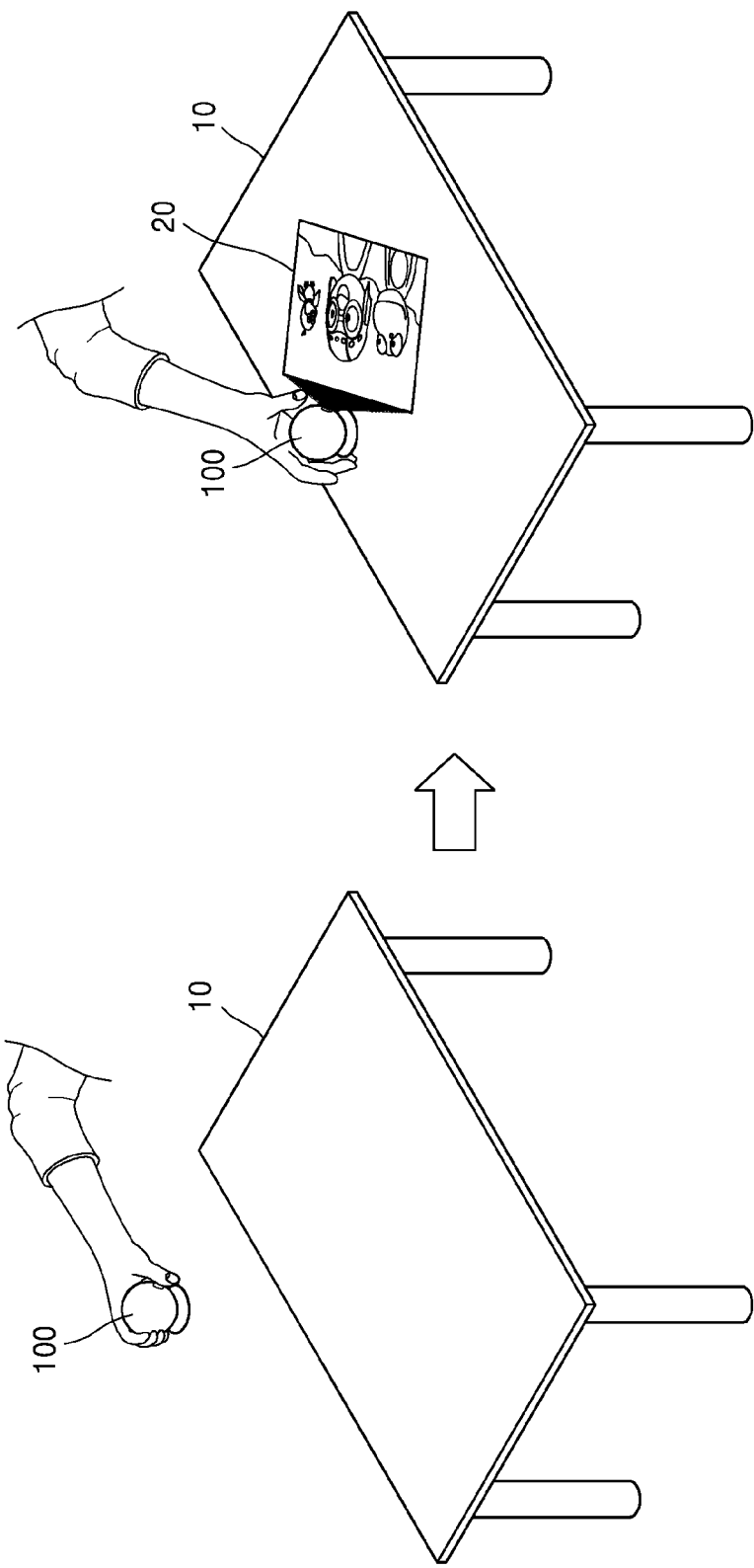
FIGS. 1A and 1B are reference diagrams showing an exemplary electronic device.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Although the terms "first," "second," etc., may be used herein to describe various elements, these elements should not be limited by these terms. The above terms are used only to distinguish one component from another. For example, a first element may be called a second element, and a second element may also be called a first element without departing from the scope of the present disclosure. The term "and/or" means any one or a combination of a plurality of related items.

The terminology used herein is for the purpose of describing particular embodiments only, and is not intended to limit the scope of the present disclosure. An expression used in the singular encompasses the expression of the plural, unless it has a clearly different meaning in the context. It will be further understood that the terms "comprises," "comprising," "includes," and/or "including" when used herein, specify the presence of stated features, integers, steps, operations, elements, components, and/or combinations thereof, but do not preclude the presence or addition of one or more other features, integers, steps, operations, elements, components, and/or combinations thereof.

Figure 1B:
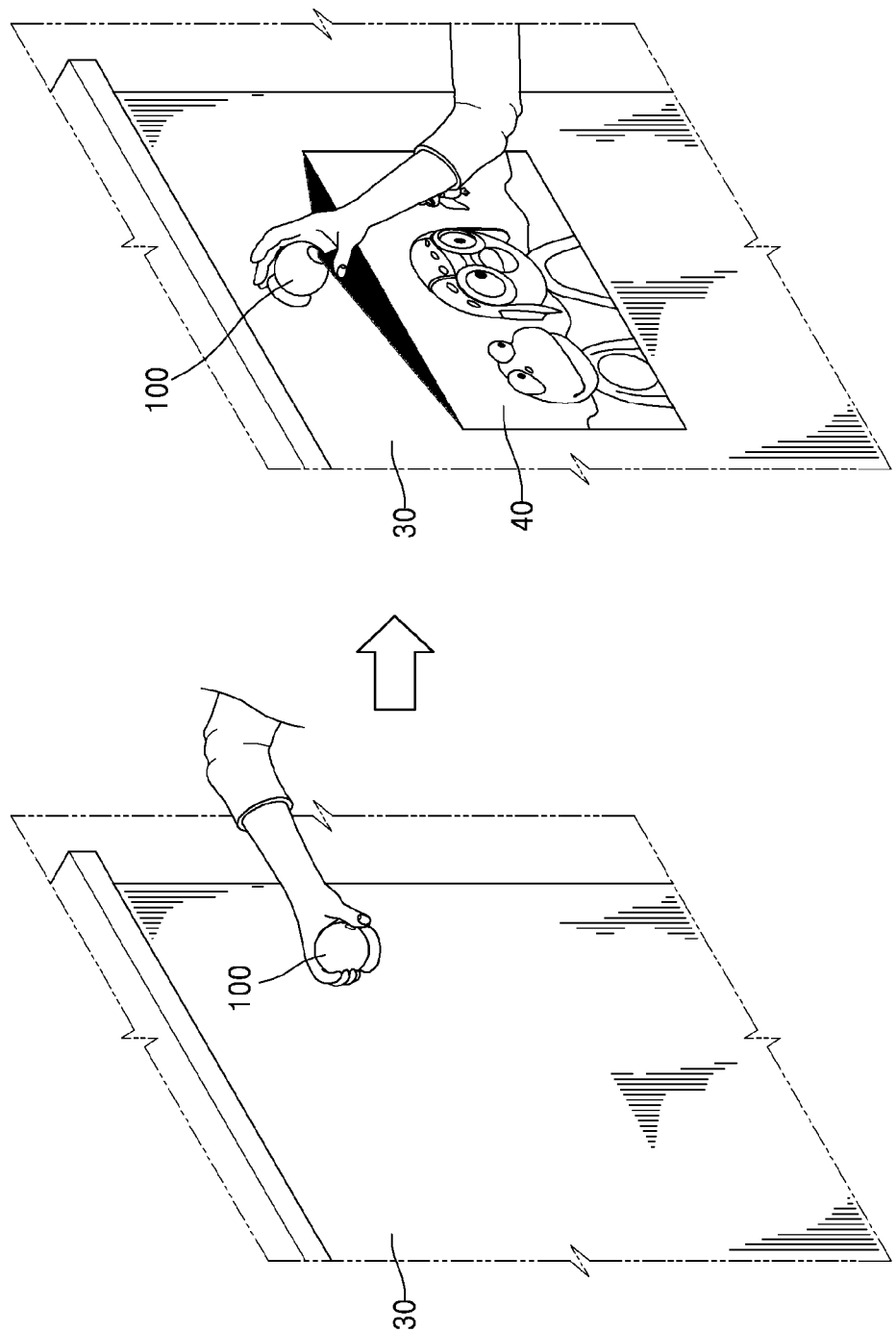

FIGS. 1A and 1B are reference diagrams showing an exemplary electronic device.

An electronic device 100 according to an exemplary embodiment may be used while positioned on a projection surface using a projector lens mirror system. The electronic device 100 may be a projector, projection system, or any device capable of projecting an image on a surface. The electronic device 100 may project still or moving images onto the projection screen for one or more users to view from a distance.

The electronic device 100, according to an aspect of an exemplary embodiment, may be positioned on a surface such as a tabletop as shown in FIG. 1A or attached to a wall as shown in FIG. 1B.

In FIG. 1A, the electronic device 100 may project an image 20 onto a projection surface, which, in this example, is a portion of a table 10 on which the electronic device 100 is positioned. The projection may be automatically triggered when a user simply places the electronic device 100 on the table 10.

In FIG. 1B, the electronic device 100, according to an aspect of an exemplary embodiment, may project an image 40 onto a projection surface, which, in this example, is a portion of a wall 30 on which the electronic device 100 is positioned. The projection may be automatically triggered when a user attaches the electronic device 100 to the wall 30.

The user may view the projection image by performing the operation of positioning the electronic device 100 on the table 10 or attaching the electronic device 100 to the wall 30 without having to further adjust the projection surface of the electronic device 100.

The electronic device 100, according to an aspect of an exemplary embodiment, may avoid or reduce unnecessary power consumption by controlling power of one or more elements or components of the electronic device 100 based on a degree of proximity between the electronic device 100 and an installation surface. The installation surface refers to a surface on which the electronic device 100 is placed, positioned, attached, mounted, or installed. For example, the installation surface can be a tabletop, a desktop, a wall, a ceiling, a floor, or any flat or curved surface on which the electronic device 100 may be affixed. The installation surface may be the same as the projection surface or the installation surface may be different from the projection surface. In other words, the electronic device 100 may project an image on the same surface on which the device is installed or on a surface other than the surface on which the device is installed.

For example, the exemplary electronic device 100 shown in FIGS. 1A and 1B has high portability and mobility, and the user may frequently move the electronic device 100 to new locations. Because the installation surface of the electronic device 100 is not determined when the electronic device 100 is being transported, the electronic device 100 need not operate. Accordingly, when the electronic device 100 is frequently moved, unnecessary power consumption may result when the electronic device 100 need not operate. Accordingly, according to an aspect of an exemplary embodiment described herein, it is possible to reduce power consumption while the electronic device 100 is being moved by controlling an operation of the electronic device 100.

According to an aspect of an exemplary embodiment, a method of controlling electric current consumption of a projector is disclosed in which a user may enjoy a viewing experience by merely placing the projector on a projection surface without the need to perform focus or keystone adjustments. By this method, it is also possible to significantly reduce a projection distance of an optical system.

According to an aspect of an exemplary embodiment, the electronic device may detect the electronic device being placed or positioned on the projection surface and recognize the positioning of the device as an indication of the completion of the installation. Thus, when the positioning is not completed, that is, the electronic device is not appropriately positioned on the installation surface, for example, when the electronic device is not positioned sufficiently close to the installation surface, the electronic device may determine that the installation has not been completed. Accordingly, according to an aspect of an exemplary embodiment, it is possible to reduce electric current consumption of the electronic device by controlling an optical system power source and a wired/wireless data connection module that affect the electric current consumption of the electronic device according to the degree of proximity.

For example, when the electronic device is a certain degree of proximity or more away from the installation surface, it is possible to control electric current consumption caused by unnecessary data connection and transmission by shutting off the optical system, terminating a connection with an external device (e.g., a computer, a cellular phone, etc.) connected with the electronic device, or terminating a data transmission. The installation surface may be the same as the projection space as shown in FIGS. 1A and 1B, but the disclosure is not limited in that regard. For example, the electronic device 100 may project an image onto a surface other than the surface on which the electronic device 100 is positioned or installed.

Figure 2A:
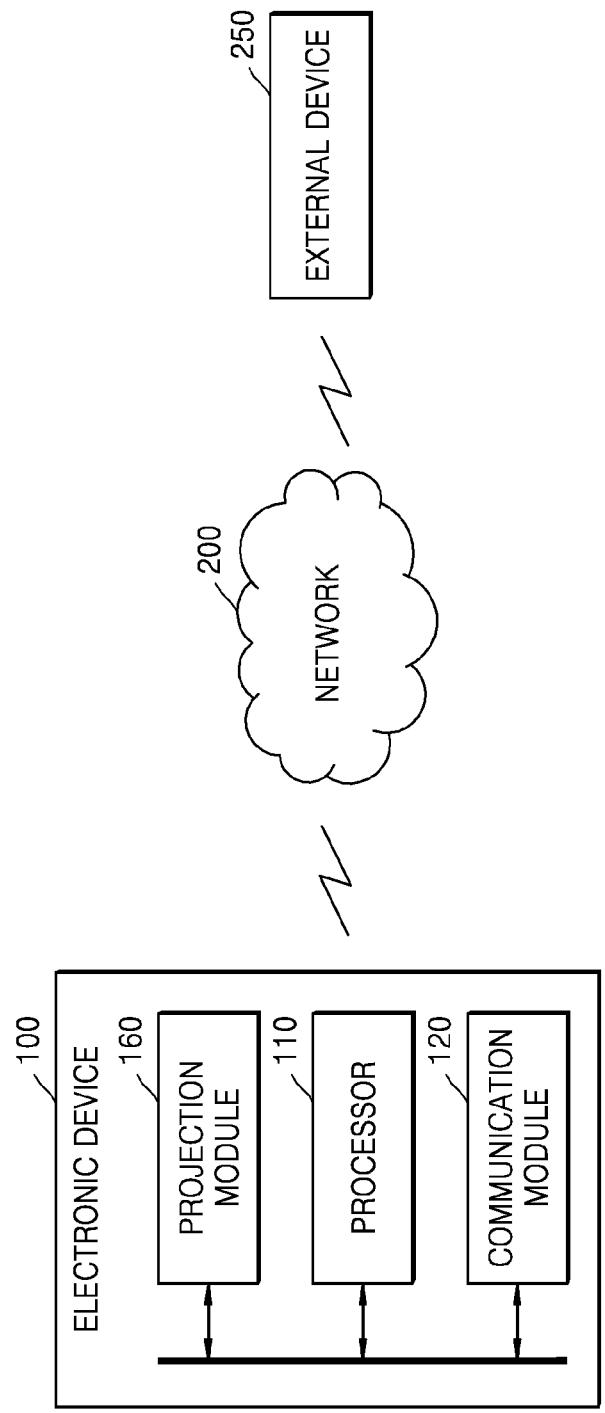
FIG. 2A is a schematic diagram showing an exemplary system in which an electronic device communicates with an external device.

FIG. 2A is a schematic diagram showing an exemplary system in which an electronic device 100 communicates with an external device 250 according to an aspect of an exemplary embodiment.

In FIG. 2A, the system may include the electronic device 100, the external device 250, and a network 200.

The network 200 may be a telecommunications network, a computer network, the Internet, the Internet of things (IOT), a telephone network, or any combination thereof. The network 200 may also include a near field communication (NFC) network, a Bluetooth (BT) network, a Wi-Fi network, a Bluetooth low energy (BLE) network, an infrared communication network, a laser beam network, or any combination thereof.

The external device 250 may include a processor and a communication module. The external device 250 may use its communication module to exchange data with the electronic device 100 through the network 200. The external device 250 may be any device that includes a processor and a communication module to communicate through a network. For example, the external device 250 can be a computer, a desktop computer, a laptop computer, a server, a mobile device, a smartphone, a tablet device, a wearable computing device, a set-top box, etc. The electronic device 100 may communicate with more than one external device.

The electronic device 100, according to an aspect of an exemplary embodiment, may include elements or components such as a projection module 160, a processor 110, and a communication module 120. However, the electronic device 100 is not limited to having only those components shown in FIG. 2A

The projection module 160 may, under the control of the processor 110, project light onto a projection surface.

The communication module 120 may, under the control of the processor 110, communicate with the external device 250 through the network 200. For example, the communication module 120 may communicate with the external device 250 using Wi-Fi, BT, BLE, infrared communication, laser beam communication, the Internet, or any combination thereof.

The processor 110 may control all or part of the elements of the electronic device 100.

According to an aspect of an exemplary embodiment, the processor 110 may control an operation of the projection module 160 and/or the communication module 120 based on a degree of proximity between the electronic device 100 and an installation surface.

According to an aspect of an exemplary embodiment, the processor 110 may control an operation of the projection module 160 and/or the communication module 120 based on a degree of proximity between the electronic device 100 and an installation surface or a duration of time the degree of proximity was maintained.

According to an aspect of an exemplary embodiment, the processor 110 may control an operation of the projection module 160 and/or the communication module 120 based on a degree of proximity between the electronic device 100 and an installation surface or information regarding whether the electronic device 100 is installed on the installation surface.

Figure 2B:
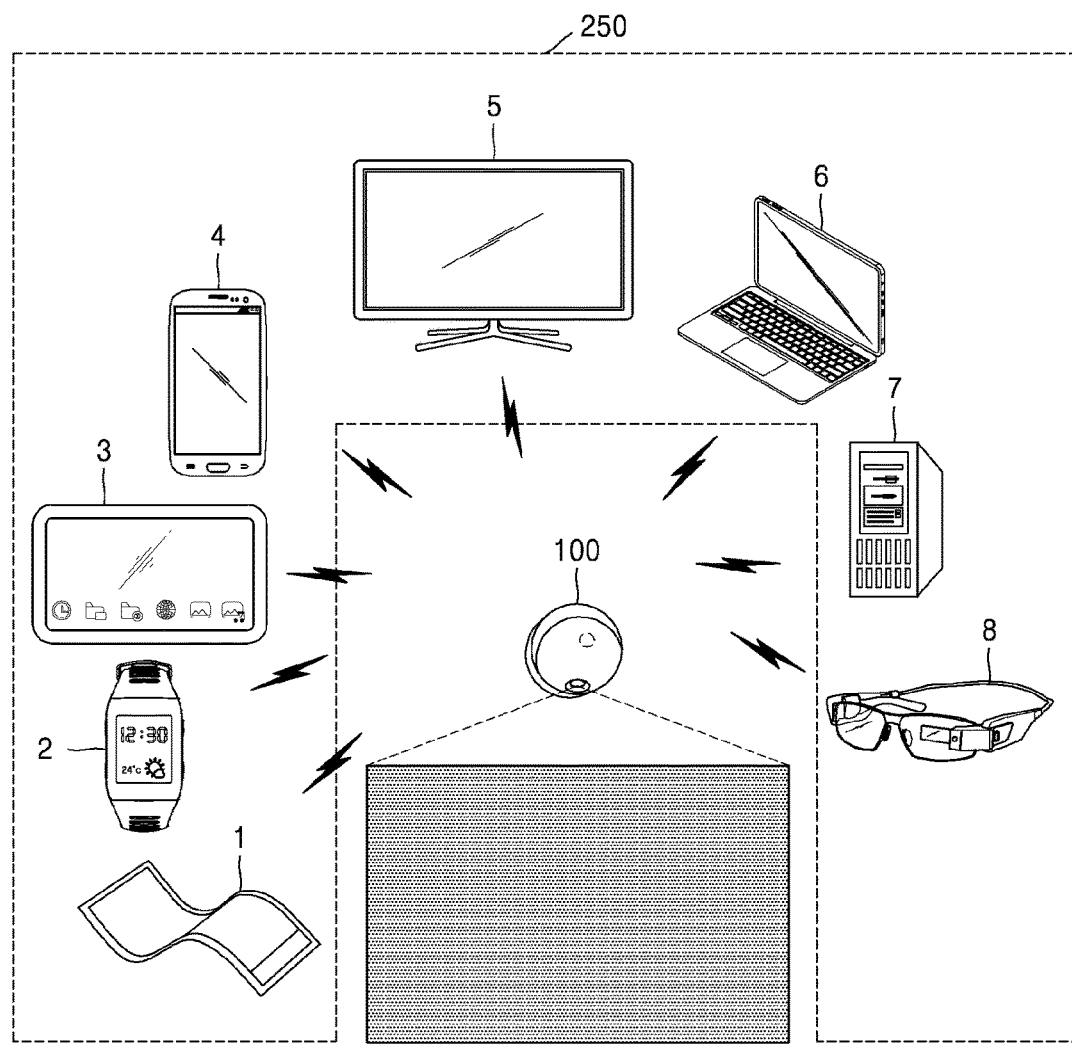
FIG. 2B shows exemplary external devices 250 with which an electronic device may exchange data.

FIG. 2B shows exemplary external devices 250 with which the electronic device 100 may exchange data.

According to an aspect of an exemplary embodiment, the electronic device 100 may receive from one or more external devices 250 and through a communication module 120 content to be projected. In FIG. 2B, the electronic device 100 may receive content in a wired or wireless manner from at least one of various external devices 250, such as a flexible computing device 1, a watch 2, a tablet computer 3, a mobile device 4, a display 5 such as a television, a laptop computer 6, a desktop computer 7, and a smart eyewear device 8. Additionally, the external devices 250 may include a smartphone, a tabletop computer, a mobile phone, an e-book reader, a personal digital assistant (PDA), a portable multimedia player (PMP), a wearable device, a smart watch, and a head-mounted device. The content received from one or more of these external devices 250 may be mirrored content from those devices or the content may be different from the content displayed on the external device that transmits the content.

Figure 3A:
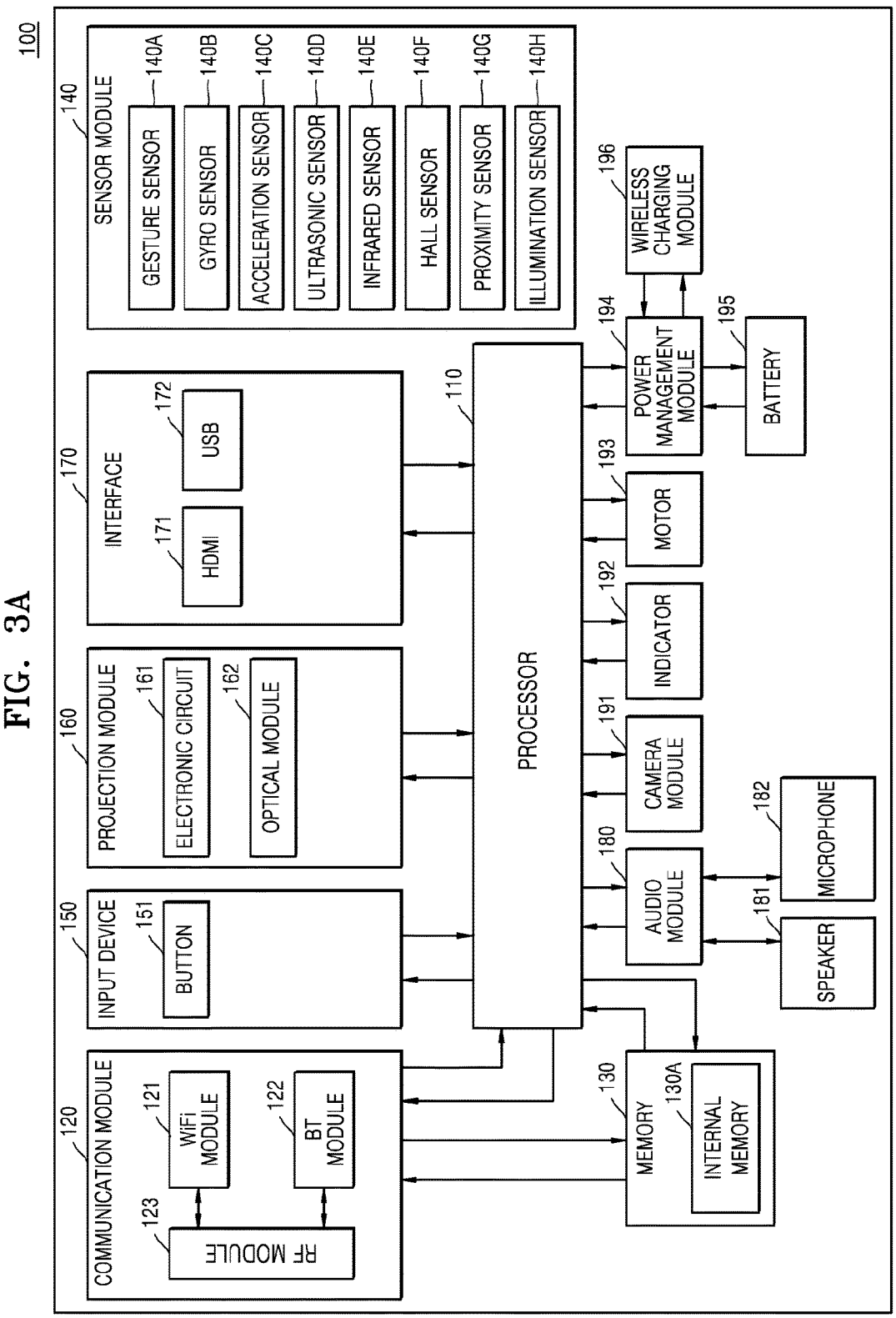
FIG. 3A shows a block diagram of an exemplary electronic device.

FIG. 3A shows a block diagram of an exemplary electronic device 100.

In FIG. 3A, for example, the electronic device 100 may include all or part of the electronic device 100 shown in FIG. 2A. Referring to FIG. 3A, the electronic device 100 may include one or more processors 110, a communication module 120, a memory 130, a sensor module 140, an input device 150, a projection module 160, an interface 170, an audio module 180, a camera module 191, an indicator 192, a motor 193, a power management module 194, a battery 195, and a wireless charging module 196.

The processor 110 may execute an operating system or one or more application programs to control the hardware or software elements and components connected to the processor 110. The processor 110 may also perform processing and operations of various types of data including multimedia data. The processor 110, for example, may be implemented as a system-on-chip (SoC). According to an embodiment, the processor 110 may further include a cache memory, a graphic processing unit (GPU), a co-processor, and the like.

According to an embodiment, the processor 110 may control operations of one or more elements or components of the electronic device 100 based on a degree of proximity between the electronic device 100 and an installation surface on which the electronic device 100 is installed.

According to an aspect of an exemplary embodiment, a proximity-based control module may control operations of one or more elements of the electronic device 100 based on a degree of proximity between the electronic device 100 and the installation surface or information regarding whether the electronic device 100 is installed on the installation surface. The proximity-based control module may be implemented with software, hardware, or a combination of both. The proximity-based control module may be stored in the memory 130 or included in the electronic device 100 as a separate module In addition, the proximity-based control module, according to an aspect of an exemplary embodiment, may control operations of one or more elements of the electronic device 100 based on a degree of proximity between the electronic device 100 and the installation surface or information regarding an angle between the electronic device 100 and an attachment member of the electronic device 100.

Here, the one or more elements controlled by the proximity-based control module may include the communication module 120 and the projection module 160, but are not limited thereto. It should be appreciated that each element or component of the electronic device 100 shown in FIG. 3A may be controlled in a like manner.

In addition, when controlling one or more elements or components of the electronic device 100, the proximity-based control module may sequentially control the elements. In other words, the proximity-based control module may regulate the individual components of the electronic device 100 incrementally. For example, when the elements to be controlled are the communication module 120 and the projection module 160, the proximity-based control module may control an operation of the projection module 160 and then may control an operation of the communication module 120 according to a degree of proximity between the electronic device 100 and the installation surface changes. For example, when the electronic device 100 moves in a direction away from the installation surface, the proximity-based control module may control the operation of the projection module 160 and then may control the operation of the communication module 120. For example, when the electronic device 100 moves in a direction toward the installation surface, the proximity-based control module may control the operation of the communication module 120 and then may control the operation of the projection module 160. The order in which the above-discussed elements or components of the electronic device 100 are controlled may be reversed or rearranged in a different way.

For example, the control of the operation of the communication module 120 may include controlling a state in which the communication module 120 is connected with the external device and/or a state in which the communication module 120 exchanges data with the external device.

For example, the control of the operation of the projection module 160 may include suspending or resuming power supply to the projection module 160. In addition, the control of the operation of the projection module 160 may include sequentially controlling operations of an electronic circuit 161 and an optical module 162 included in the projection module 160. For example, the projection module 160 may be sequentially controlled by first powering off the optical module 162 and then powering off the electronic circuit 161.

The communication module 120 may transmit and receive data in communication with other electronic devices, for example, other electronic devices or servers connected to the electronic device 100 through a network. According to an aspect of an exemplary embodiment, the communication module 120 may include a Wi-Fi module 121, a BT module 122, and a radio frequency (RF) module 123.

For example, the Wi-Fi module 121 and the BT module 122 may each include a processor that processes data transmitted or received through a corresponding module. The Wi-Fi module 121 and the BT module 122 are shown as separate blocks in FIG. 3A. However, according to an aspect of an exemplary embodiment, at least one (e.g., two or more) of the Wi-Fi module 121 and the BT module 122 may be included in one integrated chip (IC) or an IC package. For example, at least one of processors corresponding to the Wi-Fi module 121 and the BT module 122 may be implemented as one SoC.

The RF module 123 may transmit and receive data, for example, via RF signal transmission and reception. The RF module 123 may include, for example, a transceiver, a power amp module (PAM), a frequency filter, a low noise amplifier (LNA), and the like. The RF module 123 may further include a component for transmitting or receiving an electromagnetic wave over the air in wireless communication, such as a conductor or a conducting wire. Although FIG. 3A shows that the Wi-Fi module 121 and the BT module 122 share one RF module 123, at least one of the Wi-Fi module 121 and the BT module 122 may perform RF signal transmission and reception through a separate RF module.

According to an aspect of an exemplary embodiment, an operation of the communication module 120 may be sequentially or incrementally controlled according to a degree of proximity between the electronic device 100 and an installation surface under the control of the processor 110.

According to an aspect of an exemplary embodiment, connection between the communication module 120 and an external device or data transmission and reception between the communication module 120 and an external device may be sequentially controlled according to the degree of proximity between the electronic device 100 and the installation surface under the control of the processor 110.

The memory 130 may include an internal memory 130A. The internal memory 130A may include, for example, at least one of a volatile memory (e.g., a dynamic random access memory (DRAM), a static RAM (SRAM), a synchronous dynamic RAM (SDRAM), etc.) and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, a NOR flash memory, a hard disk, a solid-state drive (SSD), etc.).

The memory 130 may store various types of data, programs, or applications that drive and control the electronic device 100 under the control of the processor 110. The memory 130 may store signals or data that are input or output corresponding to the driving of the one or more processors 110, the communication module 120, the sensor module 140, the input device 150, the projection module 160, the interface 170, the audio module 180, the camera module 191, the indicator 192, the motor 193, the power management module 194, the battery 195, the wireless charging module 196, and other components.

The sensor module 140 may be an array of sensors that measure a physical quantity or sense an operation state of the electronic device 100, and may convert the measured or sensed information into an electric signal. The sensor module 140 may include, for example, a gesture sensor 140A, a gyro sensor 140B, an acceleration sensor 140C, an ultrasonic sensor 140D, an infrared sensor 140E, a Hall effect sensor 140F, a proximity sensor 140G, and an illumination sensor 140H. Additionally or alternatively, the sensor module 140 may include, for example, an E-nose sensor, an electromyography (EMG) sensor, an electroencephalogram (EEG) sensor, an electrocardiogram (ECG) sensor, an iris sensor, a fingerprint sensor, a pressure sensor, etc. The sensor module 140 may further include a control circuit that controls one or more sensors included therein.

According to an aspect of an exemplary embodiment, the sensor module 140 may use at least one sensor included therein to detect whether the electronic device 100 is positioned in proximity to the installation surface, whether the electronic device 100 is affixed on the installation surface, etc. For example, the sensor module 140 may use the gesture sensor 140A, the gyro sensor 140B, the acceleration sensor 140C, the ultrasonic sensor 140D, the infrared sensor 140E, the Hall sensor 140F, the proximity sensor 140G, and/or the illumination sensor 140H to detect the degree of proximity (i.e., distance) between the electronic device 100 and the installation surface.

The input device 150 may include a button 151. The button 151 may include, for example, a physical button, an optical button, or a keypad. Additionally or alternatively, the input device 150 may also include other input devices such as a voice recognizer, a gesture recognizer, a touchscreen, etc. According to an aspect of an exemplary embodiment, the electronic device 100 may use the communication module 120 to receive a user input from an external device (e.g., a personal computer or a server) connected with the communication module 120.

The projection module 160 may include the electronic circuit 161 and the optical module 162. The electronic circuit 161 may process content data to be projected, transmit the processed data to the optical module 162, and control the optical module 162. The optical module 162 may project light onto a projection screen to display an image. For example, the screen may be located inside or outside the electronic device 100.

According to an aspect of an exemplary embodiment, when the electronic device 100 is positioned on the installation surface or positioned within a predetermined distance from the installation surface according to the degree of proximity between the electronic device 100 and the installation surface, the projection module 160 may project light.

According to an aspect of an exemplary embodiment, when the electronic device 100 is not positioned within the predetermined distance from the installation surface according to the degree of proximity between the electronic device 100 and the installation surface, the power management module 194 may stop or reduce power supplied to the projection module 160 to allow at least a portion of the projection module 160 to cease operation.

In addition, the projection module 160 may include the electronic circuit 161 and the optical module 162. Between these two elements, the optical module 162 typically consumes more power. Accordingly, according to an aspect of an exemplary embodiment, the power management module 194 may sequentially control the power supplied to the electronic circuit 161 and the power of the optical module 162 to control the power of the projection module 160. For example, when the electronic device 100 moves in a direction away from the installation surface, the power management module 194 may first stop supplying power to the optical module 162, which has greater power consumption, and then stop supplying power to the electronic circuit 161 as the electronic device 100 moves further away from the installation surface. However, the order in which the power management module 194 suspend power supply to the electronic circuit 161 and the optical module 162 may be reversed. In addition, for example, when the electronic device 100 moves in a direction toward the installation surface, the power management module 194 may first resume supplying power to the electronic circuit 161 and then may resume supplying power to the optical module 162. The order in which the power supply is resumed to the electronic circuit 161 and the optical module 162 may be reversed.

A scheme in which the optical module 162 projects light includes digital light processing (DLP), liquid crystal on silicon (LCOS), liquid crystal display (LCD), 3LCD, laser projection, and the like.

DLP is a projection display scheme that utilizes a digital micro-mirror display (DMD), which is one of screen display elements. The LCOS scheme may also include performing projection using an LCOS panel that performs displaying by defining a pixel by a plurality of scan lines and data lines, including a crystal having a predetermined molecule arrangement, and transmitting and reflecting light input from the outside through the crystal. The 3LCD scheme includes an LCD to which lamp light is transmitted and which is divided into three parts. The 3LCD uses red, blue, and green into which each color is divided before an image originating from the lamp is enlarged by a lens through an LCD panel. A projector may also be implemented in the 3LCD scheme. In addition, similar to an LCD, the projector using one LCD panel may also be provided. Furthermore, the laser scheme may include a light source that consists of a red light emitting device, a green light emitting device, and a blue light emitting device, an optical tunnel to which laser light emitted from the light source is incident, and a display device configured to project an image onto a screen using the laser light incident through the optical tunnel. The laser scheme may also include, as a projection module, a structure including a synthesis module for performing synthesis by transmitting or reflecting some colors of the laser light emitted from the light source and a speckle remover for removing speckles by irregularly changing a phase of the laser light synthesized through the synthesis module.

The interface 170 may include, for example, a High-Definition Multimedia Interface (HDMI) 171 and a Universal Serial Bus (USB) 172. Additionally or alternatively, the interface 170 may include, for example, a Mobile High-Definition Link (MHL) interface, a Secure Digital (SD) card interface, a MultiMediaCard (MMC) interface, or an Infrared Data Association (IrDA) interface.

The audio module 180 may bi-directionally convert a sound into an electronic signal and vice versa. The audio module 180 may process sound information input or output through, for example, a speaker 181 or a microphone 182.

According to an aspect of an exemplary embodiment, the electronic device 100 may also transmit audio to an external BT device using the BT module 122 included in the communication module 120, instead of using the audio module 180.

The camera module 191 may be a device for capturing a still image or moving image. According to an aspect of an exemplary embodiment, the camera module 191 may include one or more image sensors (e.g., a front sensor or a rear sensor), a lens, an image signal processor (ISP), or a flash (e.g., a light emitting diode (LED) or a xenon lamp). The image sensor may be a charge-coupled device (CCD) or an active-pixel sensor.

The camera module 191 may receive an image (e.g., consecutive frames) corresponding to a user's motion including a gesture in a camera recognition range. For example, the recognition range of the camera module 191 may be a distance of about 0.1 meter to about 5 meters from the camera module 191 to the user. For example, the user's motion may include a body part of the user, such as the face, a facial expression, a hand, a fist, or a finger of the user, or a motion of the body part of the user.

The indicator 192 may indicate a state of the electronic device 100 or a component thereof (e.g., the processor 110), for example, a booting state, a messaging state, or a charging state.

The motor 193 may convert an electrical signal into mechanical vibration. The electronic device 100 may further include a processing device (e.g., a GPU) for supporting a mobile television feature. The processing device for supporting the mobile television feature may process media data according to a standard such as digital multimedia broadcasting (DMB), digital video broadcasting (DVB), or media flow.

The power management module 194 may manage power of the electronic device 100. The power management module 194 may include, for example, a power management IC (PMIC), a charger IC, or a battery gauge. The PMIC may be installed in, for example, an IC or an SoC semiconductor chip. The charging scheme may be based on wired or wireless connection. The charger IC may charge the battery 195 while preventing overvoltage or overcurrent originating from a charger. According to an aspect to an exemplary embodiment, the charger IC may include a charger IC for performing wired or wireless charging.

According to an aspect of an exemplary embodiment, the power management module 194 may control the power supply to one or more of components of the electronic device 100, including the communication module 120 and the projection module 160 according to the degree of proximity between the electronic device 100 and the installation surface.

According to an aspect of an exemplary embodiment, when the electronic device 100 moves in a direction away from the installation surface, the power management module 194 may suspend power supply to at least a portion of the communication module 120 or the projection module 160.

According to an aspect of an exemplary embodiment, when the electronic device 100 moves in a direction toward the installation surface, the power management module 194 may resume power supply to at least a portion of the communication module 120 or the projection module 160.

The wireless charging module 196 may include a circuit for performing wireless charging, for example, a coil loop, a resonance circuit, or a rectifier. The wireless charging scheme may be based on, for example, magnetic resonance, magnetic induction, or electromagnetic waves.

The battery gauge may measure and indicate, for example, a residual quantity of the battery 195 or a voltage, current, or temperature while charging the battery 195. The battery 195 may store or generate electricity, and may use the stored or generated electricity to supply power to the electronic device 100. The battery 195 may be, for example, a rechargeable battery, non-rechargeable battery, or a solar battery.

The above-described elements of the electronic device according to various embodiments of the present disclosure may each include one or more components, and the name of a corresponding element may vary depending on the type of the electronic device. The electronic device according to various embodiments of the present disclosure may be configured to include at least one of the aforementioned elements, and some elements may be removed or additional other elements may be added. Because some of the elements of the electronic device according to various embodiments of the present disclosure may be combined to form one entity, functions of the elements may be performed the same as before combining.

Figure 3B:
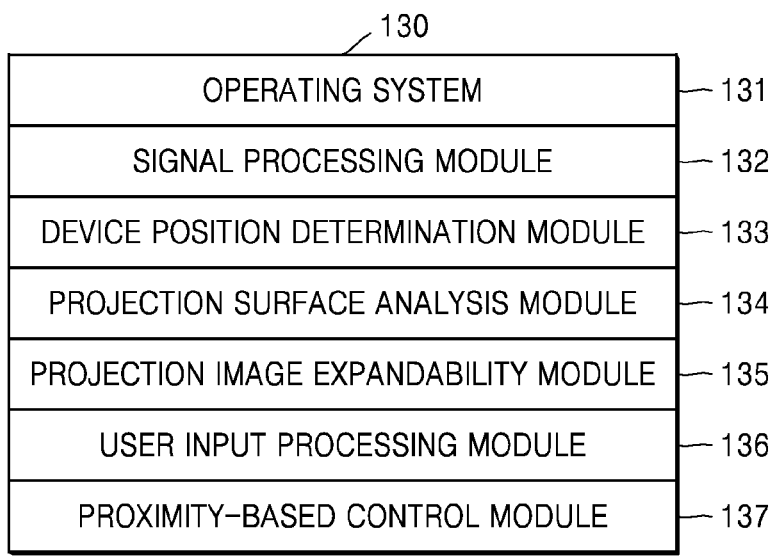
FIG. 3B shows exemplary modules stored in a memory.

FIG. 3B shows exemplary modules stored in a memory 130.

In FIG. 3B, the memory 130 may include an operating system 131, a signal processing module 132, a device position determination module 133, a projection surface analysis module 134, a projection image expandability determination module 135, a user input processing module 136, and a proximity-based control module 137.

The operating system 131, when executed by a processor, may control and oversee overall operations of the electronic device 100.

The signal processing module 132 may perform buffering or signal decryption so that content received through the communication module 120 may be displayed with the projection module 160. The signal processing module 132 may process image data received by the electronic device 100. The signal processing module 132 may perform various image processing operations, such as decoding, scaling, noise filtering, frame rate conversion, and resolution conversion, on video data.

The device position determination module 133 may determine whether the electronic device 100 is positioned, placed, attached, or installed on the installation surface.

According to an aspect of an exemplary embodiment, the device position determination module 133 may determine whether the electronic device is positioned on the installation surface or positioned within a predetermined distance from the installation surface, and may determine whether to project the content according to the determination.

The projection surface analysis module 134 may analyze a projector projection surface and correct an image if necessary.

According to an aspect of an exemplary embodiment, the projection surface analysis module 134 may sense direction information of the electronic device 100 and may correct geometric information and/or color information of a projection image on the basis of the directional information of the sensed electronic device 100. The direction information of the electronic device 100 may be sensed using the gyro sensor 140B and/or the acceleration sensor 140C included in the sensor module 140 of the electronic device 100.

The projection image expandability determination module 135 may determine whether to expand and project the projection image.

According to an aspect of an exemplary embodiment, the projection image expandability determination module 135 may determine whether there is at least one other electronic device in the vicinity of the electronic device 100, and may determine the expandability of the projection image depending on whether there is at least one other electronic device in the vicinity of the electronic device. According to an aspect of an exemplary embodiment, whether there is at least one other electronic device in the vicinity of the electronic device 100 may be sensed using a signal intensity of wireless communication between an electronic device and another adjacent electronic device through the communication module 120 included in the electronic device 100 and/or a relative distance between the electronic device 100 and the other electronic device measured through the infrared sensor 140E or the ultrasonic sensor 140D included in the sensor module 140.

When the projection image expandability determination module 135 determines the expandability of the projection image because there is at least one other electronic device in the vicinity of the electronic device 100, the projection image expandability determination module 135 may divide the projection image into two or more partial images (i.e., the projection image is spread across constituent image tiles) and may transmit at least one of the partial images to the at least one other electronic device. The electronic device 100 and the at least one other electronic device may then contiguously project the partial images to create a larger image.

The user input processing module 136 may sense a user input in the output projection image and perform data processing in response to the sensing.

The proximity-based control module 137 may control the power supply to at least a portion of the elements or components of the electronic device 100 according to the degree of proximity between the electronic device 100 and the installation surface.

As discussed above with regard to FIG. 3A, the proximity-based control module 137 may include one or more instructions for controlling operations of one or more elements of the electronic device 100 based on the degree of proximity between the electronic device 100 and the installation surface.

In addition, according to an aspect of an exemplary embodiment, the proximity-based control module 137 may include one or more instructions that control operations of one or more elements of the electronic device 100 on the basis of the degree of proximity between the electronic device 100 and the installation surface or information regarding whether the electronic device 100 is installed on the installation surface.

Furthermore, the proximity-based control module 137 according to an embodiment may include one or more instructions for controlling operations of one or more elements of the electronic device 100 on the basis of the degree of proximity between the electronic device 100 and the installation surface or information regarding an angle between the electronic device 100 and an attachment member of the electronic device 100.

Here, the one or more elements may include the communication module 120 and the projection module 160 of the electronic device 100, but are not limited thereto. It should be appreciated that each element or component of the electronic device 100 shown in FIG. 3A may be thus controlled by the proximity-based control module 137.

Figure 3C:
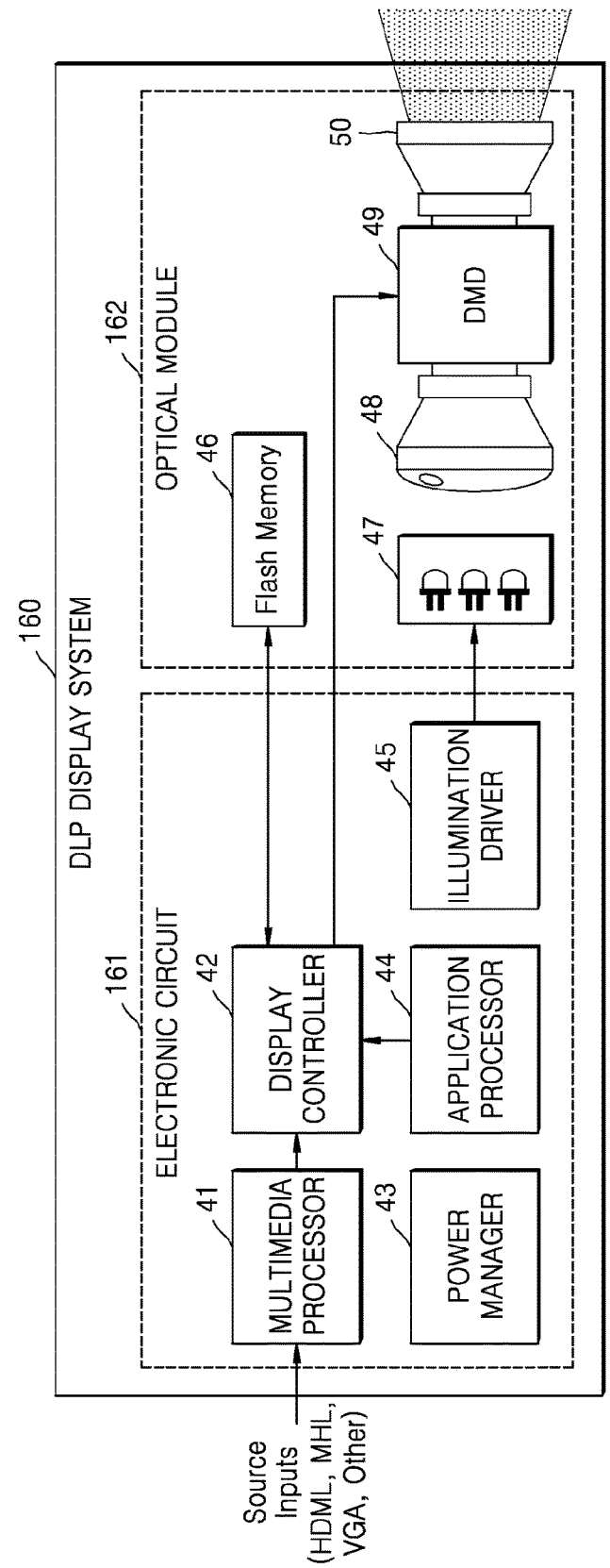
FIG. 3C shows an exemplary projection module that utilizes a digital light processing (DLP) system.

FIG. 3C shows an exemplary projection module that utilizes a DLP display system.

In FIG. 3C, the projection module 160 utilizing the DLP display system may include an electronic circuit 161 and an optical module 162.

The electronic circuit 161 may include a multimedia processor 41 configured to convert a received image signal into image data having a format for driving a DMD 49 and provide the image data to the DMD 49, a power manager 43 configured to perform power management on the DLP display system 160, an application processor 44, an illumination driver 45 configured to drive a display lamp 47, and a display controller 42 configured to control elements of the electronic circuit 161.

The optical module 162 may include the display lamp 47 configured to emit white light using supplied power and direct the emitted white light to the DMD 49 through a color wheel, a lens module 48 including a condenser lens for collecting and focusing the light and a prism for reflecting the light passing through the condenser lens, the DMD 49 configured to convert the light reflected by the prism into an image and reflect the image toward a screen, and a projection lens 50 configured to project the light reflected by the DMD 49 toward the screen.

Here, the DMD 49 may be composed of about 1.3 million micro mirrors. The DMD 49 may determine an on/off state of each of the mirrors according to the image data provided by the multimedia processor 41. Each mirror may selectively reflect the light directed by the display lamp 47, and thus the DMD 49 may display an image on the screen. That is, the DMD 49 may control light with red (R), green (G), and blue (B) colors reflected by the mirrors included in the DMD 49 based on the image data provided by the multimedia processor 41. Accordingly, the DMD 49 may display an image on the screen.

In the DLP display system 160 shown in FIG. 3C, the optical module 162 including an illumination system/DMD may cause high power consumption. When a user need not necessarily be seeing content or when the installation is not yet completed, the optical module 162 may be powered off or have its power consumption reduced in order to prevent high power consumption. Accordingly, the electronic device may be utilized for a long time.

Figure 4A:
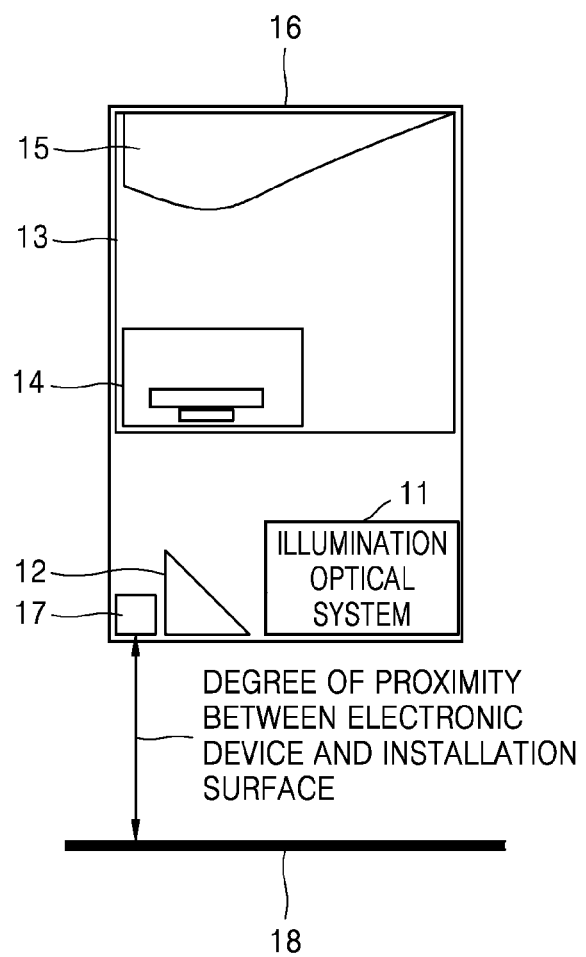
FIGS. 4A and 4B are reference diagrams showing an exemplary operation of an electronic device.
Figure 4B:
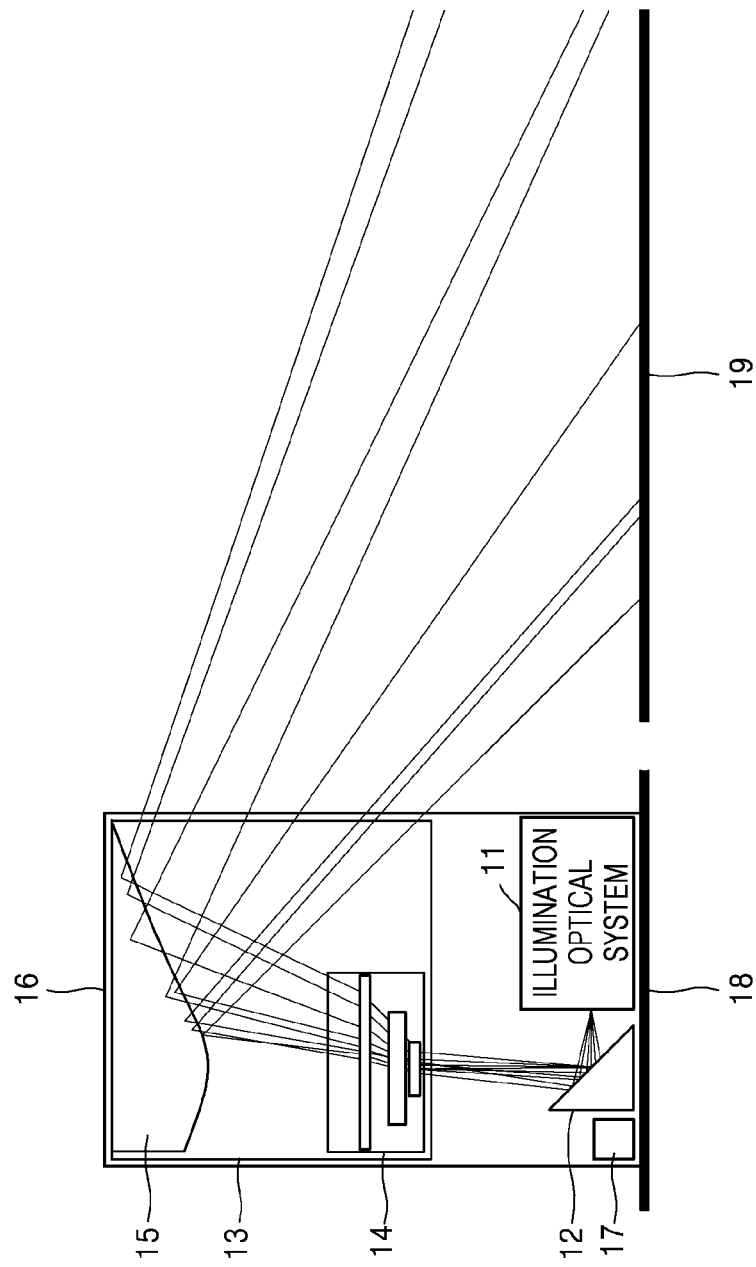

FIGS. 4A and 4B are reference diagrams showing an exemplary operation of an electronic device 100.

FIG. 4A shows a cross-section view of some elements of a housing 16 of the electronic device 100. Here, the housing 16 is not yet installed on an installation surface 18.

As shown in FIG. 4A, the housing 16 may include an illumination optical system 11 and a projection system lens 13. Light projected by the illumination optical system 11 may be refracted perpendicularly through a prism 12. The projection system lens 13 may include a lens array 14, and the lens array 14 may be configured such that an image is not distorted even with a short projection distance. In addition, the projection system lens 13 may include a mirror 15 that reflects light to the side.

Projecting an image onto a projection plane located at an area adjacent to or near the installation surface may be possible even with a short projection distance by using an ultra-short focus lens as part of a combination of lenses of the projection system lens 13.

According to an aspect of an exemplary embodiment, the optical system may be configured by horizontally aligning the illumination optical system 11 and the projection system lens 13 without the use of the prism 12.

According to an aspect of an exemplary embodiment, it is also possible to fold the electronic device 100 to reduce its size when the electronic device 100 is transported and expand the housing 16 to secure a sufficient projection distance when the electronic device 100 performs projection by unfolding and expanding the housing 16 such that a length of dimension of the housing 16 may be adjusted.

As shown in FIG. 4A, the housing 16 may also include a proximity sensor 17. The proximity sensor 17 may measure a degree of proximity between the housing 16 of the electronic device 100 and the installation surface 18 where the electronic device 100 is to be installed and/or to project light thereon. According to an aspect of an exemplary embodiment, the proximity sensor 17 may be installed in the bottom of the housing 16, that is, a portion where the housing 16 is in contact with the installation surface 18. Alternatively, the proximity sensor 17 may be installed on the bottom of the illumination optical system 11.

In FIG. 4A, the proximity sensor 17 may measure a degree of proximity between the electronic device 100 and the installation surface 18, that is, a distance from the electronic device 100 to the installation surface 18. For example, when the electronic device 100 is not in proximity to the installation surface 18, the electronic device 100 may control some of the elements to cease operation.

FIG. 4B shows the housing 16 of the electronic device 100 installed on the installation surface 18.

Referring to FIG. 4B, when the electronic device 100 is in close proximity to the installation surface 18, the proximity sensor 17 may determine that the electronic device 100 is about to be attached to the installation surface 18. In this case, the electronic device 100 may operate an element such as an illumination optical system 11 to project light to a projection surface 19.

The installation surface 18, on which the electronic device 100 is installed, may be a surface or plane that is the same as or parallel to the projection surface 19 onto which the electronic device 100 projects light.

Figure 5:
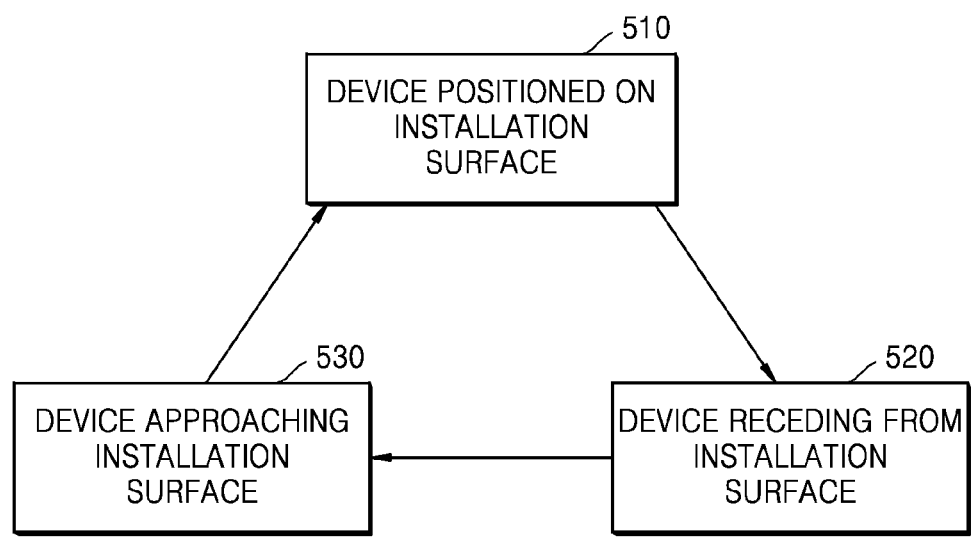
FIG. 5 is a state diagram showing three exemplary states of an electronic device.

FIG. 5 is a state diagram showing three exemplary states of the electronic device 100.

As shown in FIG. 5, the electronic device 100 may transition from a state 510 in which the electronic device 100 is kept positioned on an installation surface to a state 520 in which the electronic device 100 recedes from the installation surface, and vice versa. In addition, the electronic device 100 may transition from the state 510 or the state 520 to a state 530 in which the electronic device 100 that was farther away from the installation surface approaches the installation plane, and vice versa.

The state 510 may denote a state in which the electronic device 100 is appropriately positioned (i.e., placed, attached, or installed) on the installation surface, and thus all elements or components of the electronic device 100 may operate normally at full power. In this state, for example, a communication module 120 of the electronic device 100 may transmit and receive data with an external device while maintaining connection to the external device, and also a projection module 160 of the electronic device 100 may project light.

The state 520 may denote a state in which the electronic device 100 is now detached from the installation surface, for example, to be transported by a user to another location. In this state, an operation of the electronic device 100 projecting light or an operation of the electronic device 100 connecting with an external device or exchanging data may not be as necessary. Accordingly, in the state 520 in which the device recedes from the installation surface, the electronic device 100 may stop or reduce the supply of power to the projection module 160, the communication module 120, or any other elements or components of the electronic device 100.

The state 530 may denote a state in which a user brings the electronic device 100 closer to the installation surface in order, for example, to position the electronic device 100 on the installation surface. Accordingly, when the electronic device 100 is positioned on the installation surface, it may be necessary to control the projection module 160, the communication module 120, or any other elements or components of the electronic device 100 such that they now operate at full capacity. That is, in the state 530, in which the device approaches the installation surface, the electronic device 100 may control the communication module 120 of the electronic device 100 to reconnect to an external device or resume exchanging data, or may resume supplying power to the projection module 160 of the electronic device 100.

Figure 6:
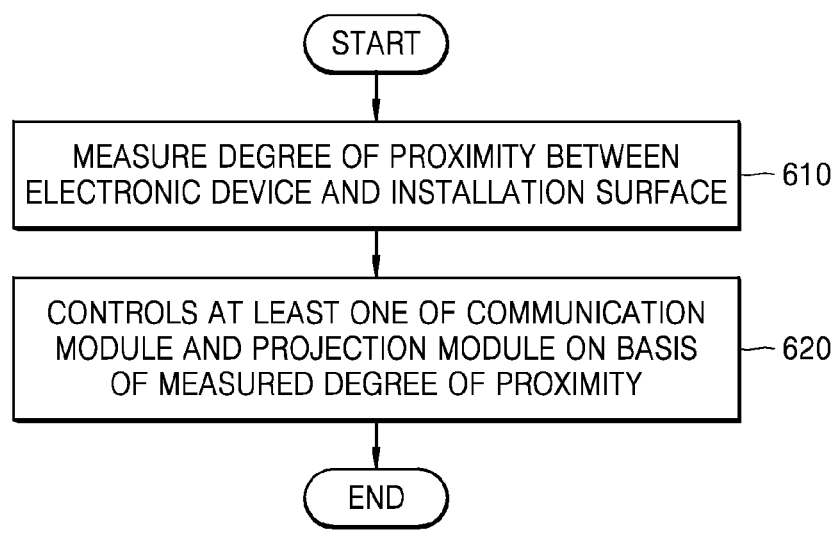
FIG. 6 is a flowchart showing an exemplary operation of an electronic device that is controlled according to a degree of proximity between the electronic device and an installation surface.

FIG. 6 is a flowchart showing an exemplary operation of an electronic device that is controlled according to a degree of proximity between the electronic device and an installation surface.

In step S610, an electronic device 100 may measure a degree of proximity between the electronic device 100 and an installation surface.

According to an aspect of an exemplary embodiment, a processor 110 of the electronic device 100 may use a proximity-based control module 137 to determine the degree of proximity (i.e., distance) between the electronic device 100 and the installation surface.

The proximity-based control module 137 may analyze a sensor value measured by one or more sensors included in the sensor module 140 in order to measure the degree of proximity between the electronic device 100 and the installation surface. For example, a proximity sensor 140G, an illumination sensor 140H, a Hall sensor (e.g., a Hall effect IC) 140F, an ultrasonic sensor 140D, an infrared sensor 140E, and/or a pressure sensor may be used.

In S620, the electronic device 100 may control at least one of a communication module 120 and a projection module 160 on the basis of the measured degree of proximity.

According to an aspect of an exemplary embodiment, when it is determined that the electronic device 100 has moved in a direction away from the installation surface according to the measured degree of proximity, the processor 110 of the electronic device 100 may control the communication module 120 or the projection module 160 not to operate.

For example, the electronic device 100 moving in a direction away from the installation surface may denote that the electronic device 100 communicates with an external device while the electronic device 100 is positioned on the installation plane, or that the electronic device 100 moves in the direction away from the installation plane while the electronic device 100 projects light through an optical module. In this case, when the electronic device 100 senses that the electronic device 100 is receding from the installation surface, even if the electronic device 100 does not receive an explicit input from the user for controlling power of the electronic device 100, the electronic device 100 may incrementally or sequentially control one or more modules operating in the electronic device 100 to power down.

According to an aspect of an exemplary embodiment, when it is sensed that the electronic device 100 is receding from the installation surface according to the degree of proximity sensed, the electronic device 100 may first control the projection module 160 to cease operation and then subsequently control the communication module 120 not to cease operation. For example, the controlling of the projection module 160 to cease operation may include stopping supply of power to the projection module 160. For example, the controlling of the communication module 120 to cease operation may include controlling the communication module 120 to disconnect from an external device or controlling the communication module 120 to stop exchanging data with the external device.

According to an aspect of an exemplary embodiment, when it is determined that the electronic device 100 is moving in a direction toward the installation surface according to the measured degree of proximity, the processor 110 of the electronic device 100 may control the communication module 120 or the projection module 160 to resume operation.

For example, the electronic device 100 moving in the direction toward the installation plane may denote that the user is transporting the electronic device 100 in order to place the electronic device 100 on the installation surface. When a distance between the electronic device 100 and the installation surface is relatively large (e.g., greater than a predetermined threshold distance), the projection module 160 or the communication module 120 of the electronic device 100 may not be in operation. Accordingly, when it is determined that the electronic device 100 is approaching the installation surface, even without an explicit input received from the user for controlling power of the electronic device 100, the electronic device 100 may incrementally or sequentially control one or more suspended modules in the electronic device 100 to commence or resume operation.

According to an aspect of an exemplary embodiment, when it is sensed that the electronic device 100 is approaching the installation surface according to the degree of proximity, the electronic device 100 may first control the communication module 120 to commence or resume operation and then may subsequently control the projection module 160 to commence or resume operation. For example, the controlling of the communication module 120 to operate may include controlling the communication module 120 to reconnect to an external device or controlling the communication module 120 to resume exchanging data with the external device. For example, the controlling of the projection module 160 to operate may include resuming a power supply to the projection module 160.

Figure 7:
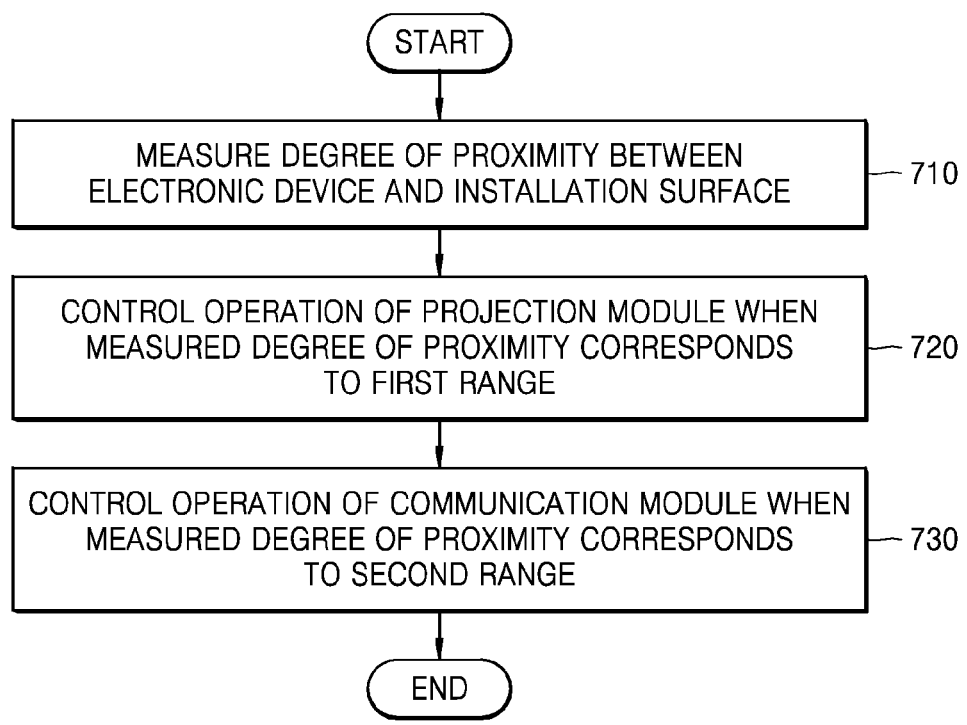
FIG. 7 is a flowchart showing an exemplary operation of an electronic device that is controlled according to a degree of proximity between the electronic device and an installation surface.

FIG. 7 is a flowchart showing an exemplary operation of an electronic device that is controlled according to a degree of proximity between the electronic device and an installation surface.

As shown in FIG. 7, in S710, an electronic device 100 may measure a degree of proximity between the electronic device 100 and the installation surface.

According to an aspect of an exemplary embodiment, a processor 110 of the electronic device 100 may use a proximity-based control module 137 to determine the degree of proximity between the electronic device 100 and the installation surface.

The proximity-based control module 137 may analyze a sensor value measured by one or more sensors included in a sensor module 140 in order to measure the degree of proximity between the electronic device 100 and the installation surface. For example, a proximity sensor 140G, an illumination sensor 140H, a Hall sensor (e.g., a Hall effect IC) 140F, an ultrasonic sensor 140D, an infrared sensor 140E, and/or a pressure sensor may be used.

In S720, the electronic device 100 may control an operation of the projection module 160 of the electronic device 100 when the measured degree of proximity corresponds to a first range.

For example, when the degree of proximity corresponds to the first range while the electronic device 100 is moving in a direction away from the installation plane, the electronic device 100 may stop supplying power to the projection module 160 of the electronic device 100. For example, when the degree of proximity corresponds to the first range while the electronic device 100 is moving in a direction toward the installation plane, the electronic device 100 may resume supplying power to the projection module 160 of the electronic device 100.

In S730, when the measured degree of proximity corresponds to a second range, the electronic device 100 may control an operation of the communication module 120 of the electronic device 100.

For example, when the degree of proximity corresponds to the second range, which is smaller than the first range, while the electronic device 100 is moving in a direction away from the installation surface, the electronic device 100 may perform control to stop the operation of the communication module 120. For example, when the degree of proximity corresponds to the second range while the electronic device 100 is moving in a direction toward the installation surface, the electronic device 100 may perform control to resume the operation of the communication module 120 of the electronic device 100. In another example, if the electronic device 100 transitions in its degree of proximity to the installation surface from the first range to the second range smaller than the first range, the electronic device 100 may determine that the electronic device 100 is moving towards the installation surface. On the other hand, if the electronic device 100 transitions from the second range to the first range, then it may be determined that the electronic device 100 is moving away from the installation surface.

Figure 8:
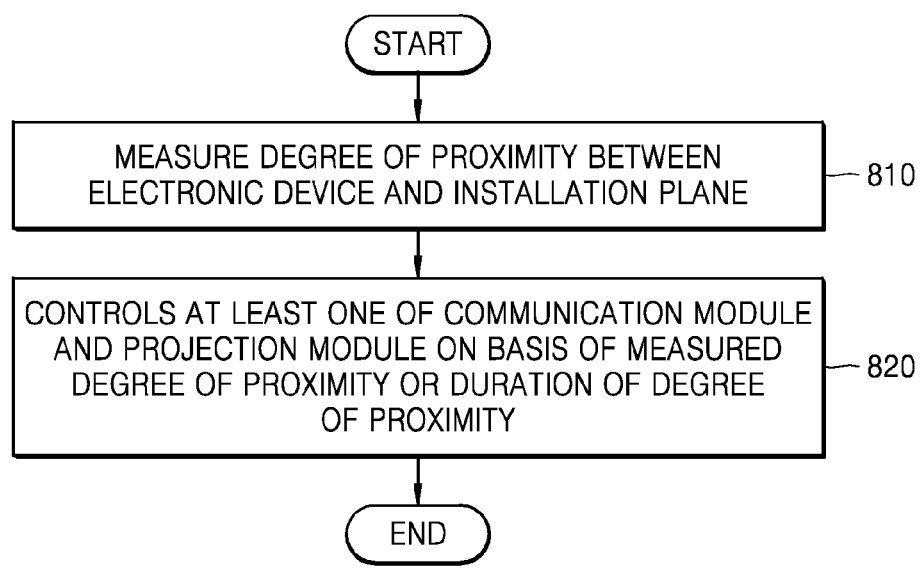
FIG. 8 is a flowchart showing an exemplary operation of an electronic device that is controlled according to a degree of proximity between the electronic device and an installation surface.

FIG. 8 is a flowchart showing an exemplary operation of an electronic device that is controlled according to a degree of proximity between the electronic device and an installation surface.

As shown in FIG. 8, in S810, an electronic device 100 may measure a degree of proximity between the electronic device 100 and the installation surface.

According to an aspect of an exemplary embodiment, a processor 110 of the electronic device 100 may use a proximity-based control module 137 to determine the degree of proximity between the electronic device 100 and the installation surface.

The proximity-based control module 137 may analyze a sensor value measured by one or more sensors included in a sensor module 140 in order to measure the degree of proximity between the electronic device 100 and the installation surface. For example, a proximity sensor 140G, an illumination sensor 140H, a Hall sensor (e.g., a Hall effect IC) 140F, an ultrasonic sensor 140D, an infrared sensor 140E, and/or a pressure sensor may be used.

In S820, the electronic device 100 may control at least one of a communication module 120 and a projection module 160 on the basis of the measured degree of proximity or a duration of the degree of proximity. The duration of the degree of proximity may represent a duration of time the electronic device 100 maintains the degree of the proximity. In other words, the duration of the degree of proximity corresponds to how long the electronic device 100 maintained its distance from the installation surface for.

According to an aspect of an exemplary embodiment, when it is determined that the electronic device 100 is moving in a direction away from the installation surface according to the measured degree of proximity or the duration of the degree of proximity, the processor 110 of the electronic device 100 may control the communication module 120 or the projection module 160 to reduce power consumption or cease operation all together.

According to an aspect of an exemplary embodiment, when it is determined that the electronic device 100 is moving in a direction toward the installation surface according to the measured degree of proximity or the duration of the degree of proximity, the processor 110 of the electronic device 100 may control the communication module 120 or the projection module 160 to commence or resume operation.

An operation of the electronic device 100 controlling an operation of the communication module 120 or the projection module 160 according to the degree of proximity or the duration of the degree of proximity according to an embodiment shown in FIG. 8 will be further described with reference to FIGS. 9 to 13.

Figure 9:
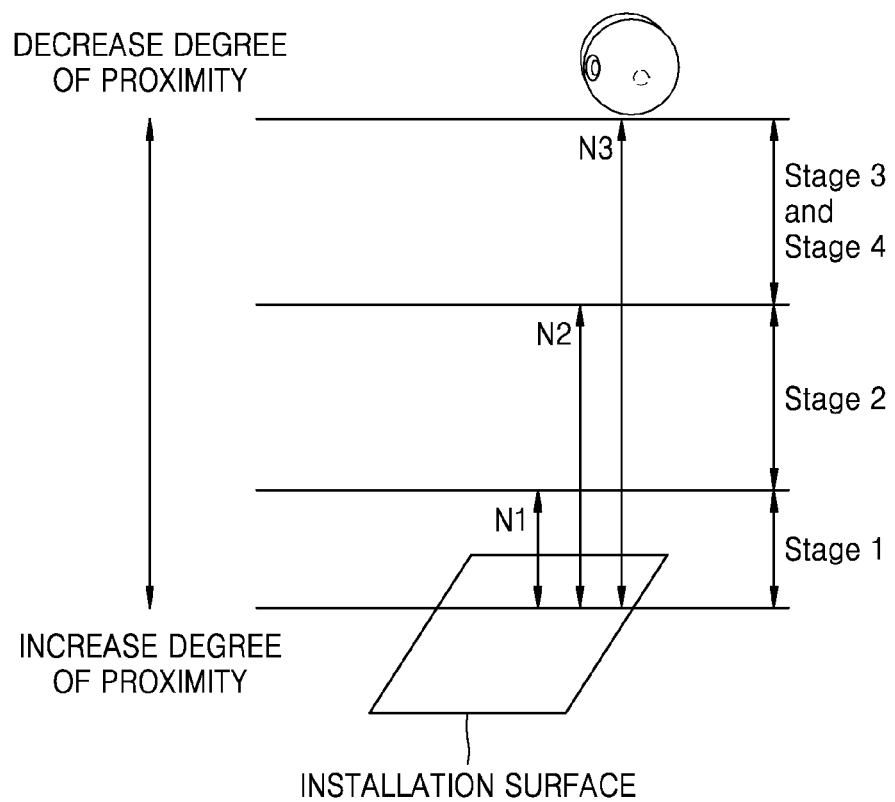
FIG. 9 is a diagram showing varying degrees of proximity between an electronic device and an installation surface.

FIG. 9 is a diagram showing varying degrees of proximity between an electronic device 100 and an installation surface.

In FIG. 9, a degree of proximity between the electronic device 100 and the installation surface may be classified into one of four stages.

For example, Stage 1 may be a degree of proximity when a distance between the electronic device 100 and an installation surface 800 is less than N1.

Stage 2 may be a degree of proximity when the distance between the electronic device 100 and the installation surface 800 is greater than or equal to N1 and less than N2.

Stage 3 and stage 4 may each be a degree of proximity when the distance between the electronic device 100 and the installation surface 800 is greater than or equal to N2 and less than N3. In stage 3 and stage 4, the degree of proximity between the electronic device 100 and the installation surface 800 may be the same. However, stage 3 and stage 4 may be distinguished from each other according to the duration of the degree of proximity. For example, stage 3 may be determined when the duration of the degree of proximity is lower than a threshold time duration, and stage 4 may be determined when the duration of the degree of proximity is higher than the threshold.

The degree of proximity between the electronic device 100 and the installation plane 800 may increase as the electronic device 100 moves toward the stage 1 distance range, and the degree of proximity between the electronic device 100 and the installation plane 800 decreases as the electronic device 100 moves toward the stage 4 distance range.

According to an aspect of an exemplary embodiment, elements of the electronic device 100 may be controlled according to the stages shown in FIG. 9. However, the stages shown in FIG. 9 are merely an example, and thus it should be understood that the stages may be divided into various ranges. For example, the stages may be divided into two or three stages or may be divided into five or more stages. One of ordinary skill in the art will also understand the boundary conditions associated with each of the stages may be different from what is illustrated in the example discussed above. For example, stage 2 may be determined when a distance between the electronic device 100 and the installation surface 800 is greater than N1 and less than or equal to N2, etc. In some aspects, it is also possible to have the duration of degree of proximity be the determining factor between stages other than stage 3 and stage 4. For example, it is possible to have stage 1 and stage 2 share the same distance range but be distinguished from each other by the duration of time the electronic device 100 stays within the distance range.

According to an aspect of an exemplary embodiment, as shown in FIG. 9, the electronic device 100 may reduce its power consumption and also be ready to perform projection before the electronic device 100 is positioned on the installation surface by incrementally controlling elements of the electronic device 100 in stages.

Figure 10:
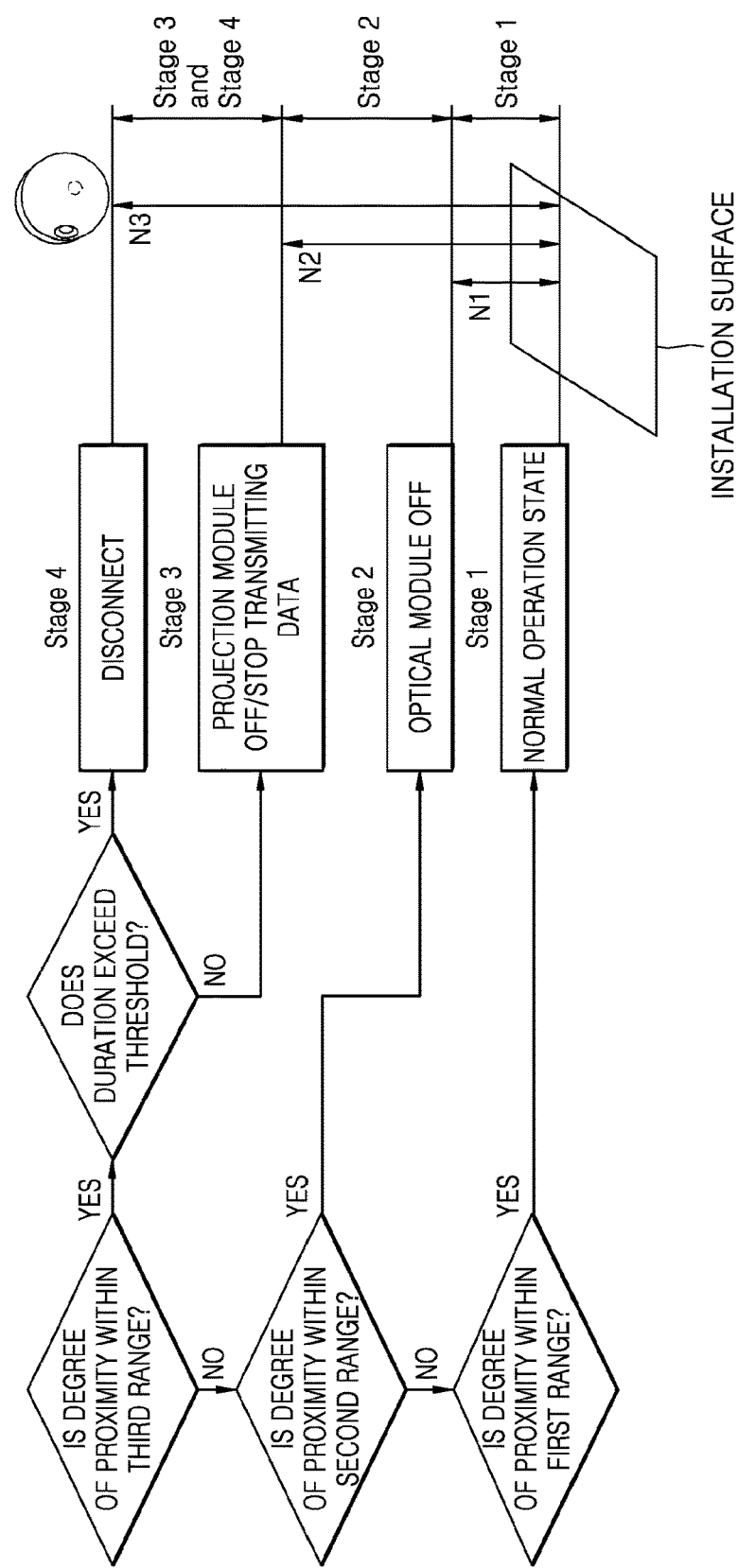
FIG. 10 shows an exemplary operation of an electronic device when the electronic device recedes from an installation surface.

FIG. 10 shows an exemplary operation of the electronic device 100 when the electronic device 100 recedes from the installation surface 800. FIG. 11 shows exemplary operation states of the electronic device 100 at various stages as the electronic device 100 recedes from the installation surface 800. An operation of the electronic device 100 at each stage will be described below with reference to FIGS. 10 and 11.

In FIG. 10, when the degree of proximity between the electronic device 100 and the installation surface 800 corresponds to the first range, the electronic device 100 may be considered to be in stage 1 and maintain a normal operation state.

As shown in FIG. 11, in the normal operation state of stage 1 of the electronic device 100, a projection module and an optical module may be turned on, a data transmission state may indicate that data is being transmitted, and a data connection state may indicate "connected." That is, the electronic device 100 may maintain the normal operation state until the electronic device 100 recedes from the installation surface 800 to a distance greater than or equal to N1.

When the degree of proximity between the electronic device 100 and the installation surface 800 corresponds to the second range, the electronic device 100 may enter stage 2 and turn off the optical module of the projection module.

As shown in FIG. 11, stage 2 is the same as stage 1 except that only the optical module of the projection module is turned off. That is, because only the optical module of the projection module is turned off, the remaining elements of the projection module (e.g., an electronic circuit) may be kept turned on. In addition, in stage 2, the data transmission state may indicate that data is being transmitted, and the data connection state may indicate "connected."

When the degree of proximity between the electronic device 100 and the installation surface 800 corresponds to a third range, the electronic device 100 may determine whether a duration for which the degree of proximity between the electronic device 100 and the installation surface 800 is within the third range exceeds a threshold.

When the degree of proximity is within the third range but a result of the determination is that the duration for which the degree of proximity is within the third range does not yet exceed the threshold, the electronic device 100 enters stage 3. In stage 3, the electronic device 100 may turn off all the elements of the projection module, and may control the communication module 120 to stop exchanging data.

As shown in FIG. 11, in stage 3 of the electronic device 100, all the projection modules may be turned off, the data transmission state may indicate that the data transmission is stopped, and the data connection state may indicate, "connected."

When the duration for which the degree of proximity between the electronic device 100 and the installation surface 800 is within the third range exceeds the threshold, the electronic device 100 may enter stage 4. In stage 4, the electronic device 100 may control the communication module 120 to disconnect from an external device.

As shown in FIG. 11, in stage 4 of the electronic device 100, all the projection modules may be turned off, the data transmission state may indicate that the data transmission is to be stopped, and the data connection state may indicate, "disconnected." When the degree of proximity between the electronic device 100 and the installation surface 800 maintains a certain range for more than the threshold duration of time, power consumption of the electronic device 100 may be reduced by stopping an operation of the communication module 120 of the electronic device 100 and powering off the projection module 160.

In FIG. 10, the electronic device 100 may determine whether the degree of proximity is within the third range. If the degree of proximity is within the third range, the electronic device 100 may determine whether the duration of proximity exceeds the threshold. If the duration of proximity exceeds the threshold, then it may be determined that the electronic device 100 is in stage 4 and data connection may be disconnected. If the duration of proximity does not exceed the threshold, then it may be determined that the electronic device 100 is in stage 3 and thus the entire projection module may be powered off and transmission of data may be stopped.

On the other hand, if the degree of proximity is not within the third range, the electronic device 100 may determine whether the degree of proximity is within the second range. If the degree of proximity is within the second range, then the electronic device 100 may determine that it is in stage 2 and thus power off the optical module. If, on the other hand, the degree of proximity is not within the second range (i.e., the degree of proximity is within the first range), then the electronic device 100 may be in stage 1 and thus operate normally.

Figure 12:
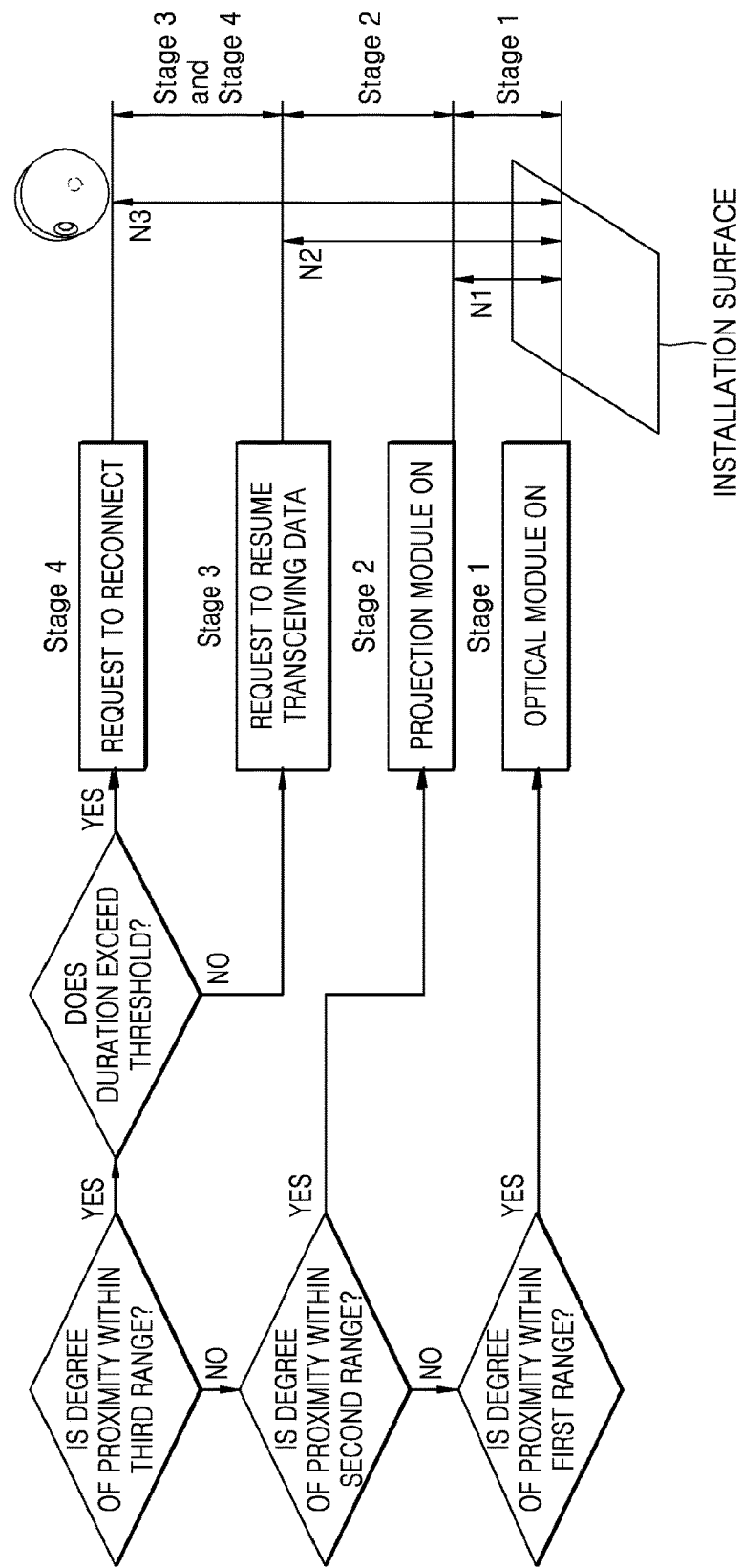
FIG. 12 shows an exemplary operation of an electronic device as the electronic device approaches an installation surface.

FIG. 12 shows exemplary operation states of the electronic device 100 as various stages as the electronic device 100 approaches the installation surface 800. FIG. 13 shows exemplary operation states of the electronic device 100 at various stages as the electronic device 100 approaches the installation surface 800. An operation of the electronic device 100 at each stage will be described below with reference to FIGS. 12 and 13.

In FIG. 12, when the distance between the electronic device 100 and the installation surface 800 is between N2 and N3, and the degree of proximity corresponds to the third range, the electronic device enters stage 3 or stage 4. In this case, the electronic device 100 may determine whether a duration of the degree of proximity exceeds a threshold and may enter stage 4 when the duration does not exceed the threshold. In stage 4, the electronic device 100 may control the communication module 120 to send a request to reconnect to an external device.

As shown in FIG. 13, in stage 4 of the electronic device 100, the data connection state may indicate that reconnection is requested, the data transmission state may indicate that the data transmission is stopped, and all the elements of the projection module including the optical module may be turned off.

Next, when the electronic device 100 may determine that the duration of the degree of proximity exceeds a threshold in stage 4, the electronic device 100 may enter stage 3. In this case, the electronic device 100 may control the communication module 120 to send a request to resume transmission of data with an external device.

As shown in FIG. 13, in stage 3 of the electronic device 100, the data connection state may indicate that the electronic device 100 is connected with an external device, the data transmission and reception state may indicate that a request to resume transmission is to be sent, and all the elements of the projection module in addition to the optical module may be turned off.

When the degree of proximity of the electronic device 100 corresponds to the second range, the electronic device 100 may enter stage 2 and resume supplying power to the projection module 160. In this case, the electronic device 100 may resume supplying power only to an electronic circuit of the projection module 160 and not to the optical module thereof.

Referring to FIG. 13, in stage 2 of the electronic device 100, the data connection state may indicate "connected," the data transmission state may indicate that data is to be transmitted, and the projection module 160 (e.g., electronic circuit) excluding the optical module is to be turned on.

Next, when the degree of proximity of the electronic device 100 corresponds to the first range, the electronic device 100 may enter stage 1 and resume supplying power to the remaining components of the electronic device 100 including the optical module of the projection module 160.

As shown in FIG. 13, in stage 1 of the electronic device 100, the data connection state may indicate, "connected," the data transmission state may indicate that data is to be transmitted, and all the elements of the projection module 160 in addition to the optical module are turned on.

In FIG. 12, the electronic device 100 may determine whether the degree of proximity is within the third range. If the degree of proximity is within the third range, the electronic device 100 may determine whether the duration of proximity exceeds the threshold. If the duration of proximity exceeds the threshold, then it may be determined that the electronic device 100 is in stage 4 and data connection may be resumed. If the duration of proximity does not exceed the threshold, then it may be determined that the electronic device 100 is in stage 3 and thus the electronic device 100 may resume transmission of data.

On the other hand, if the degree of proximity is not within the third range, the electronic device 100 may determine whether the degree of proximity is within the second range. If the degree of proximity is within the second range, then the electronic device 100 may determine that it is in stage 2 and thus turn on the projection module. If, on the other hand, the degree of proximity is not within the second range (i.e., the degree of proximity is within the first range), then the electronic device 100 may be in stage 1 and thus turn on the optical module.

Figure 14:
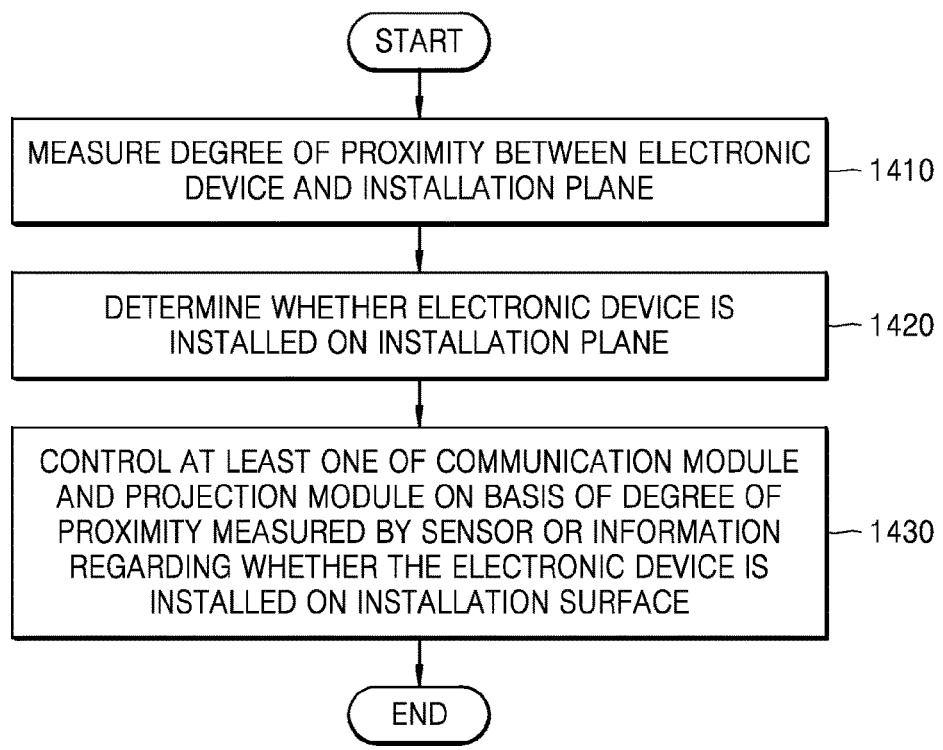
FIG. 14 is a flowchart showing exemplary operations of an electronic device that is controlled according to a degree of proximity or whether the electronic device is installed on an installation surface.

FIG. 14 is a flowchart showing exemplary operations of an electronic device that is controlled according to a degree of proximity or whether the electronic device is installed on an installation surface.

As shown in FIG. 14, in S1410, an electronic device 100 may measure a degree of proximity between the electronic device 100 and an installation surface.

According to an aspect of an exemplary embodiment, a processor 110 of the electronic device 100 may use a proximity-based control module 137 to determine the degree of proximity between the electronic device 100 and the installation surface.

The proximity-based control module 137 may analyze a sensor value measured by one or more sensors included in a sensor module 140 in order to measure the degree of proximity between the electronic device 100 and the installation surface. For example, a proximity sensor 140G, an illumination sensor 140H, a Hall sensor (e.g., a Hall effect IC) 140F, an ultrasonic sensor 140D, an infrared sensor 140E, and/or a pressure sensor may be used.

In S1420, the electronic device 100 may determine whether the electronic device 100 is installed on the installation surface.

When the electronic device 100 is used while positioned, for example, on a floor or a table, the electronic device 100 may be ready to perform projection by simply placing the electronic device 100 on the floor or the table.

However, when the electronic device 100 is used while installed on a wall, a separate installation process may be needed to affix the electronic device 100 on the wall instead of simply positioning the electronic device 100 on the wall. The installation of the electronic device 100 on the wall may be performed in various ways.

For example, the electronic device 100 may be attached to an attaching member (e.g., a wall mount) that is installed on the wall. According to an aspect of an exemplary embodiment, after a horseshoe-shaped structure is attached to a position where the electronic device 100 is expected to be attached, the electronic device 100 may be attached to the structure. In this case, when the electronic device 100 has been attached to the horseshoe-shaped structure, the electronic device 100 may be allowed to project an image. For example, as shown in FIG. 15A, because a wall mount such as a magnet 1500 is affixed on the wall and the electronic device 100 also includes a magnet or a metal piece, the electronic device 100 may be installed on the wall by attaching the electronic device 100 to the magnet 1500 affixed on the wall.

According to an aspect of an exemplary embodiment, after a ring-shaped structure is attached to a position where the electronic device 100 is expected to be attached, the electronic device 100 may be attached to the structure. In this case, when the electronic device 100 has been attached to the ring-shaped structure, the electronic device 100 may be allowed to project an image. For example, the electronic device 100 may be connected to a wall mount such as a ring installed on the wall. For example, as shown in FIG. 15B, because the wall mount such as the ring 1550 is affixed on the wall and the electronic device 100 may also include a connection member (e.g., a hook) that may be connected to the ring 1550, the electronic device 100 may be installed on the wall by connecting the electronic device 100 to the ring 1550 affixed on the wall.

In case of the horseshoe-shaped structure, the ring-shaped structure, or a foldable structure (see FIG. 18), an attachment part that is attached to an attachment surface (i.e., installation surface) may be formed with an adhesive tape, an adhesive material, a magnet, a hanger structure, a nail, a staple, or a combination thereof. Thus, an electronic device may be attached and installed in various places without regard to a change of materials on various installation surfaces, such as glass, a magnetic material, and a desk.

In S1430, the electronic device 100 may control at least one of a communication module and a projection module on the basis of a degree of proximity measured by a sensor or information regarding whether the electronic device is installed on the installation surface.

According to an aspect of an exemplary embodiment, when it is determined that the electronic device 100 is moving in a direction toward the installation plane according to the measured degree of proximity, the processor 110 of the electronic device 100 may control the communication module 120 or the projection module 160 to operate. In this case, the determination may be further based on the information regarding whether the electronic device is installed on the installation surface.

For example, when the electronic device 100 senses that the electronic device 100 is approaching the installation surface according to the degree of proximity, the electronic device 100 may first control the communication module 120 to commence or resume operation. And then, when the electronic device 100 senses that the electronic device 100 approaches more closely to the installation surface and also determines that the electronic device 100 is installed (e.g., placed, positioned, attached, etc.) on the installation surface, the electronic device 100 may control the projection module 160 to commence or resume operation.

Figure 16:
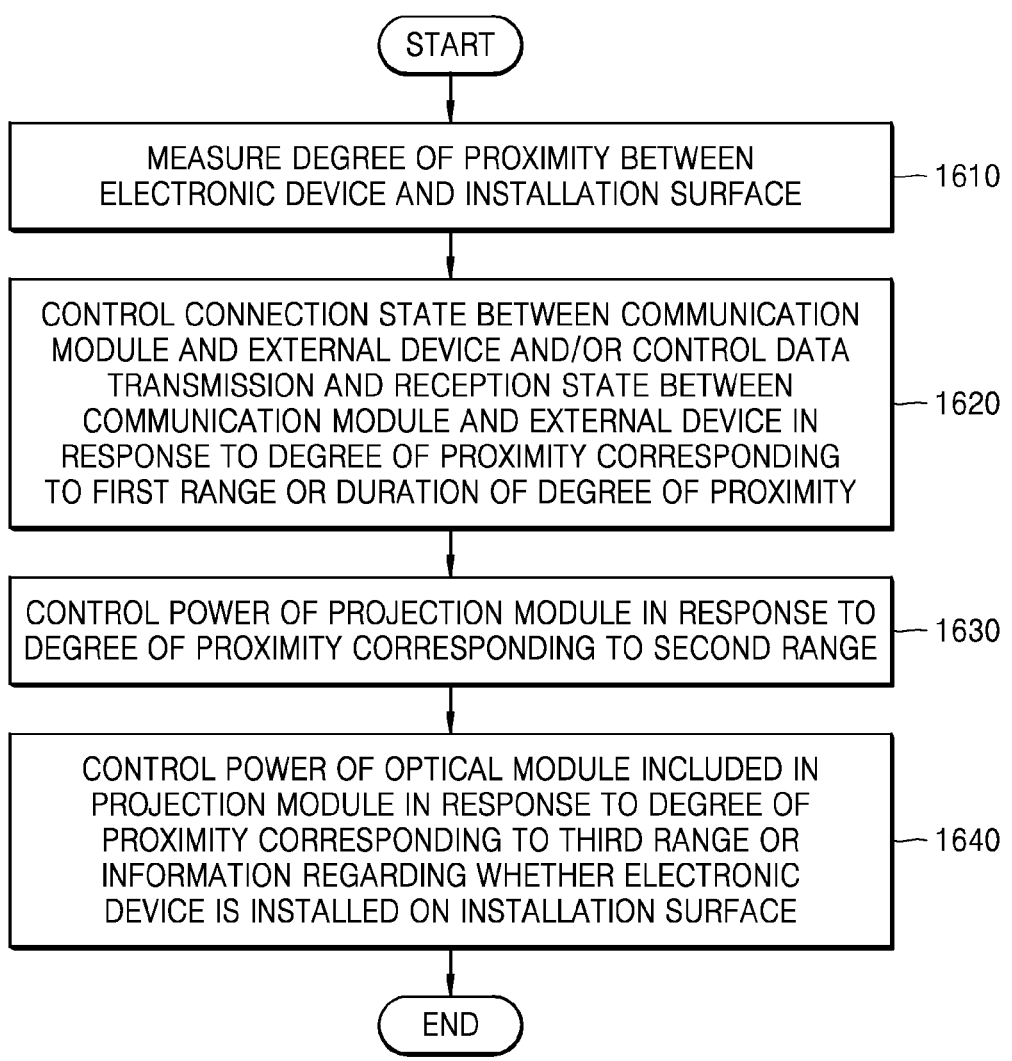
FIG. 16 is a flowchart showing exemplary operations of controlling an element of an electronic device on the basis of a degree of proximity, a duration of the degree of proximity, and whether the electronic device is installed.

FIG. 16 is a flowchart showing exemplary operations of controlling an element of an electronic device on the basis of a degree of proximity, a duration of the degree of proximity, and whether the electronic device is installed.

Referring to FIG. 16, in S1610, an electronic device 100 may measure a degree of proximity between the electronic device 100 and an installation surface.

According to an aspect of an exemplary embodiment, a processor 110 of the electronic device 100 may use a proximity-based control module 137 to determine the degree of proximity between the electronic device 100 and the installation surface.

The proximity-based control module 137 may analyze a sensor value measured by one or more sensors included in a sensor module 140 in order to measure the degree of proximity between the electronic device 100 and the installation surface. For example, a proximity sensor 140G, an illumination sensor 140H, a Hall sensor (e.g., a Hall effect IC) 140F, an ultrasonic sensor 140D, an infrared sensor 140E, and/or a pressure sensor may be used.

In S1620, the electronic device 100 may control a connection state between a communication module and an external device and/or control a data transmission and reception state between the communication module and the external device according to a first range of the degree of proximity or a duration of the degree of proximity.

For example, the electronic device 100 may control a connection state between the communication module and the external device when the degree of proximity corresponds to the first range and the duration of the degree of proximity does not exceed a threshold, and may control a data transmission and reception state between the communication module and the external device when the duration of the degree of proximity exceeds the threshold.

In S1630, the electronic device 100 may control power of a projection module 160 according to a second range of the degree of proximity. For example, when the measured degree of proximity corresponds to the second range, the electronic device 100 may resume supplying power to the projection module 160. In this case, the electronic device 100 may stop supplying power to the optical module of the projection module 160.

In S1640, the electronic device 100 may control power of the optical module included in the projection module 160 according to a third range of the degree of proximity or information regarding whether the electronic device is installed on the installation surface. For example, when the measured degree of proximity corresponds to the third range and it is determined that the electronic device 100 is installed on the installation surface, the electronic device 100 may supply power to the optical module of the projection module 160.

Figure 17:
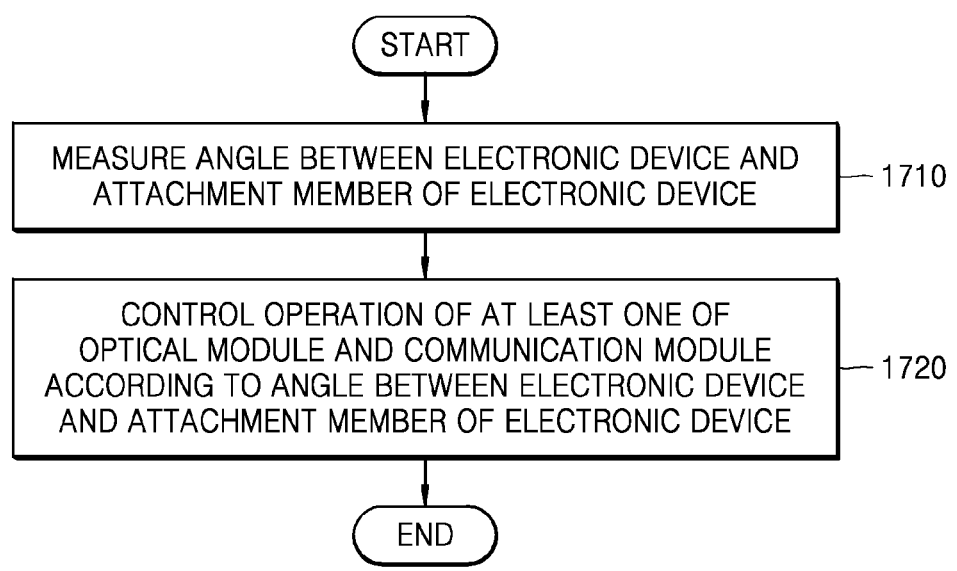
FIG. 17 is a flowchart showing exemplary operations of controlling an element of an electronic device according to an angle between the electronic device and an attachment member of the electronic device.

FIG. 17 is a flowchart showing exemplary operations of controlling an element of an electronic device according to an angle between the electronic device and an attachment member of the electronic device according to an embodiment.

In FIG. 17, in S1710, an electronic device 100 may measure an angle between the electronic device 100 and an attachment member of the electronic device 100.

Figure 18B:
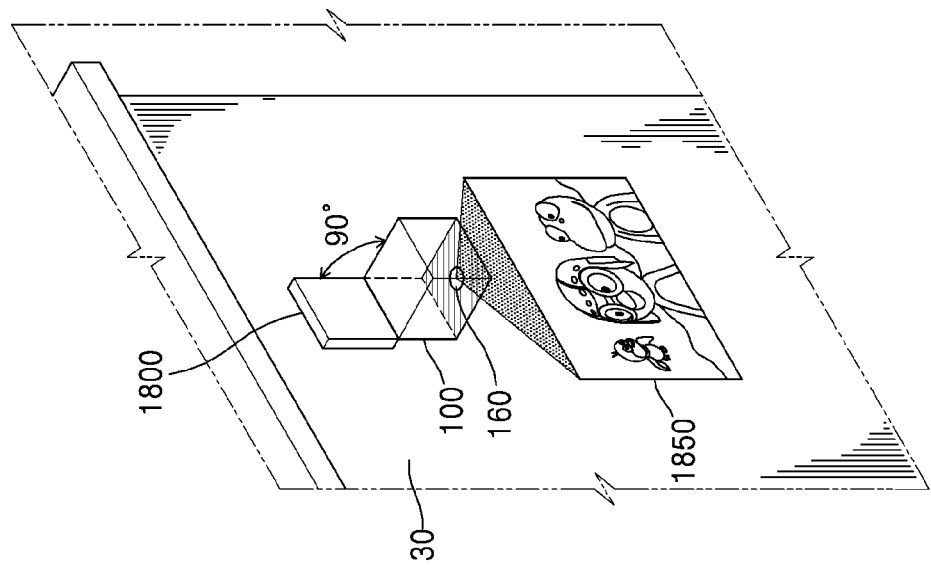
FIGS. 18A and 18B are diagrams showing an exemplary relationship between an electronic device and an attachment member.
Figure 18A:
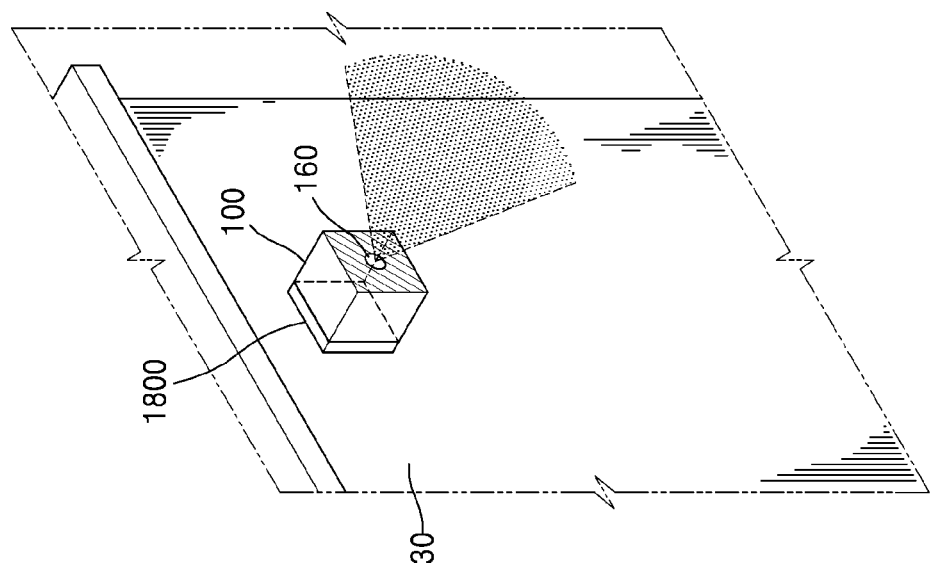

The electronic device 100 may have a special structure which is installable on a wall. For example, as shown in FIGS. 18A and 18B, the electronic device 100 may include a member (e.g., a mount, a rack, a hanger, a holder) for installing the electronic device 100 on the wall. A member 1800 may be connected with the electronic device 100 using a hinge structure. Thus, the member 1800 that was folded at one plane of the electronic device 100 may be unfolded to perform an operation of the electronic device 100. Referring to FIG. 18A, the electronic device 100 may be attached to a wall via the member 1800, and then may be unfolded, for example, 90 degrees from the member 1800, thus directing the projection module 160 of the electronic device 100 toward an installation plane 1850 that is a part of the wall. In such a structure of the electronic device 100, the electronic device 100 may not be ready to perform projection merely by bringing the electronic device 100 in proximity to the installation surface, but may be ready to perform the projection by bringing the electronic device 100 in proximity to the installation surface and then unfolding, expanding, pivoting, or bending the electronic device 100 from the member 1800. Accordingly, in this case, operations of elements of the electronic device 100 may be controlled according to an angle between the electronic device 100 and the attachment member 1800. In particular the angle may be a folding angle between the electronic device 100 and the attachment member 1800.

As shown in FIG. 18A, the angle between the electronic device 100 and the installation surface may be 0 degrees when the electronic device 100 overlaps the member 1800, or when the electronic device 100 is in the folded position. As shown in FIG. 18B, the angle between the electronic device 100 and the member 1800 may be, for example, 90 degrees when an optical module 162 of the electronic device 100 is ready to perform the projection onto the installation surface. The angle that triggers projection, however, may be greater than or less than 90 degrees. For example, the angle can be 45 degrees, 80 degrees, 100 degrees, 135 degrees, etc.

The electronic device 100 may measure an angle between the electronic device 100 and the attachment member 1800 of the electronic device 100.

The angle between the attachment member 1800 and the electronic device 100 may be measured in various ways. According to an aspect of an exemplary embodiment, the electronic device 100 and the attachment member 1800 may each be configured to include a bending sensor. The bending sensor may include, for example, a pair of electrode patterns provided at separate positions on a flexible substrate and a paste layer coated on the flexible substrate on which the electrode patterns are formed. The bending sensor may be configured to measure a change in electrical resistance between the electrode patterns due to a change in a density of conductive particles between the electrode patterns when the flexible substrate is bent.

According to various embodiments, the electronic device 100 may include one or more acceleration sensors (e.g., an X-axis acceleration sensor, a Y-axis acceleration sensor, and a Z-axis acceleration sensor) in three axis directions that are perpendicular to each other (e.g., an X-axis direction, a Y-axis direction, and a Z-axis direction). The acceleration sensor may be configured to calculate a pitch angle or a roll angle from a voltage value measured from the acceleration sensor at each axis to measure a variation of an incline of the attachment member 1800.

According to various embodiments, a Hall sensor may be included in the attachment member 1800 to measure a degree of bending. The Hall sensor is a device that varies its output voltage in response to the strength of a magnetic field, and uses the Hall effect. The Hall effect is the production of an electric field (i.e., a voltage difference) perpendicular to an electric current in an electrical conductor when the current flows through the conductor to generate a magnetic field perpendicular to the current. A voltage difference occurs due to a magnetic field when a flip cover is opened. The Hall sensor senses the magnetic field to determine whether the flip cover is opened. According to an aspect of an exemplary embodiment, the Hall sensor may be included in the attachment member 1800 to determine a degree of bending.

In S1720, the electronic device 100 may control an operation of at least one of an optical module and a communication module according to an angle between the electronic device 100 and the attachment member 1800 of the electronic device 100.

For example, as shown in FIGS. 18A and 18B, the electronic device 100 may sequentially control the optical module and the communication module according to the angle between the electronic device 100 and the attachment member 1800 of the electronic device 100.

For example, since the angle between the electronic device 100 and the attachment member 1800 may be maximally 90 degrees, the electronic device 100 may control the communication module when the angle is in the range of 0 degrees to 45 degrees and may control the optical module when the angle is in the range of 45 degrees to 90 degrees. For example, presuming that the attachment member 1800 of the electronic device 100 is attached to a wall, the electronic device 100 may control the communication module when an angle between the electronic device 100 and the attachment member 1800 is within a first range, and may control the optical module when the angle between the electronic device 100 and the attachment member 1800 is within a second range.

FIG. 19 is a reference diagram showing element control states for exemplary stages in an operation of controlling an element of an electronic device according to an angle between the electronic device and an attachment member of the electronic device.

In FIG. 19, when an angle between an electronic device 100 and an attachment member of the electronic device 100 is greater than or equal to 0 degrees and less than 25 degrees, the electronic device 100 may correspond to stage 1. In stage 1, the electronic device 100 may control a communication module to send a request to reconnect to an external device. In stage 1, data transmission may be stopped, and a projection module including the optical module may be turned off.

When the angle is greater than or equal to 25 degrees and less than 50 degrees, the electronic device 100 may correspond to stage 2. In stage 2, the electronic device 100 may control the communication module to send a request to resume transmission of data with an external device. In stage 2, a data connection state may indicate, "connected," and the projection module including the optical module may be turned off.

When the angle is greater than or equal to 50 degrees and less than 90 degrees, the electronic device 100 may correspond to stage 3. In stage 3, the electronic device 100 may resume supplying power to the projection module. However, power still may still not be supplied to an optical module of the projection module, and the electronic device 100 may be connected to an external device to exchange data with the external device.

When the angle reaches 90 degrees, the electronic device 100 may correspond to stage 4. In stage 4, the electronic device 100 may resume supplying power to the optical module of the projection module. In stage 4, the communication module may transmit data, and all the elements of the projection module may be turned on in normal operating conditions.

Figure 20:
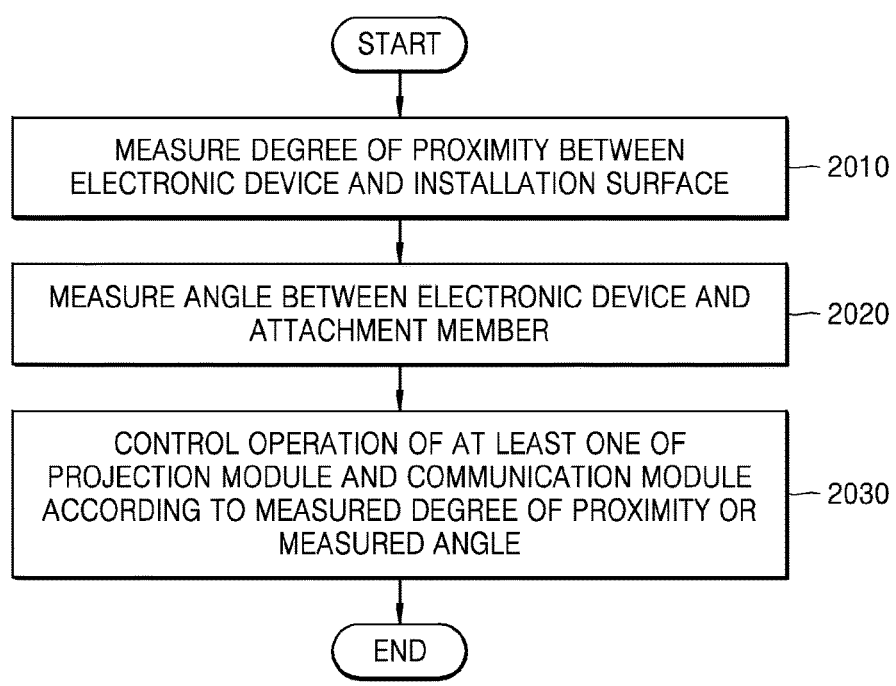
FIG. 20 is a flowchart of an exemplary operation of controlling an element of an electronic device according to a degree of proximity between the electronic device and an installation surface or an angle between the electronic device and an attachment member.

FIG. 20 is a flowchart of an exemplary operation of controlling an element of an electronic device according to a degree of proximity between the electronic device and an installation surface or an angle between the electronic device and an attachment member.

As shown in FIG. 20, in S2010, an electronic device 100 may measure a degree of proximity between the electronic device 100 and the installation surface.

In S2020, the electronic device 100 may measure an angle between the electronic device 100 and the attachment member.

In S2030, the electronic device 100 may control an operation of at least one of a projection module and a communication module according to the measured degree of proximity or the measured angle.

The stages in which the electronic device 100 uses the measured degree of proximity to control the projection module and the communication module may be similar to the stages shown in FIG. 13. However, in an example shown in FIG. 20, the control according to the angle between the electronic device and the attachment member may be added to the last operation of the stages, that is, the first stage.

For example, the state of the electronic device 100 in stage 4 or stage 3 shown in FIG. 21 may be the same as the state of the electronic device 100 in stage 4 or stage 3 shown in FIG. 13. However, in an example shown in FIG. 21, in stage 1, which is the last stage, the electronic device 100 may send a request to resume transmission of data, and also may further use the angle between the electronic device and the attachment member in order to resume supplying power to an optical module of the projection module. That is, in stage 1, the electronic device 100 may use a value obtained by measuring an angle between the electronic device and the attachment member to resume supplying power to the optical module of the projection module when the value is equal to or greater than 90 degrees or a predetermined angle. Accordingly, even if the electronic device 100 has a degree of proximity corresponding to stage 1, the electronic device 100 may not supply power to the optical module of the projection module when the angle between the electronic device 100 and the attachment member has not exceeded the predetermined angle, and may supply power to the optical module of the projection module when the angle between the electronic device 100 and the attachment member has exceeded the predetermined angle. Accordingly, when the electronic device 100 is almost ready to perform the projection, the electronic device 100 may resume supplying power to the optical module of the projection module.

Figure 22A:
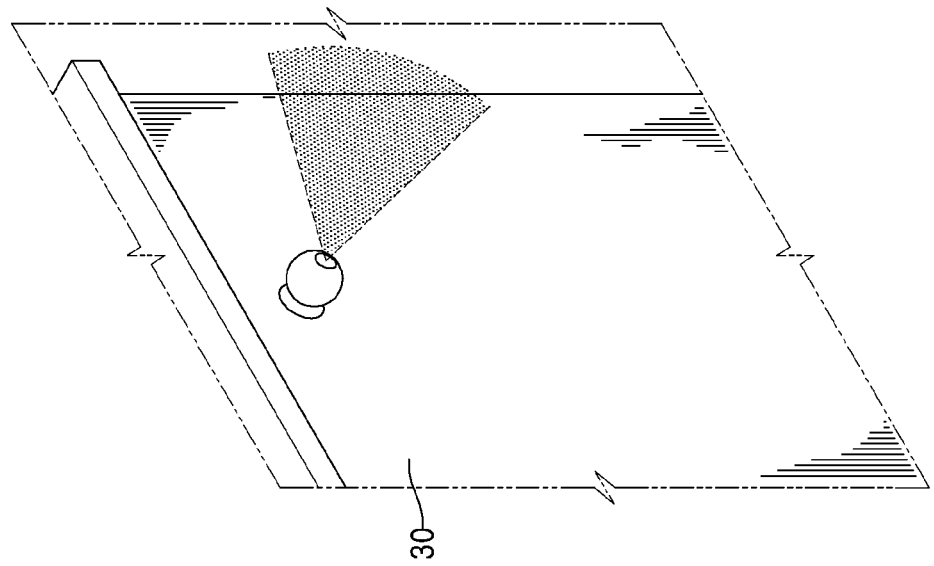
FIGS. 22A and 22B are reference diagrams showing an exemplary use of an electronic device in combination with sequential control of the electronic device.
Figure 22B:
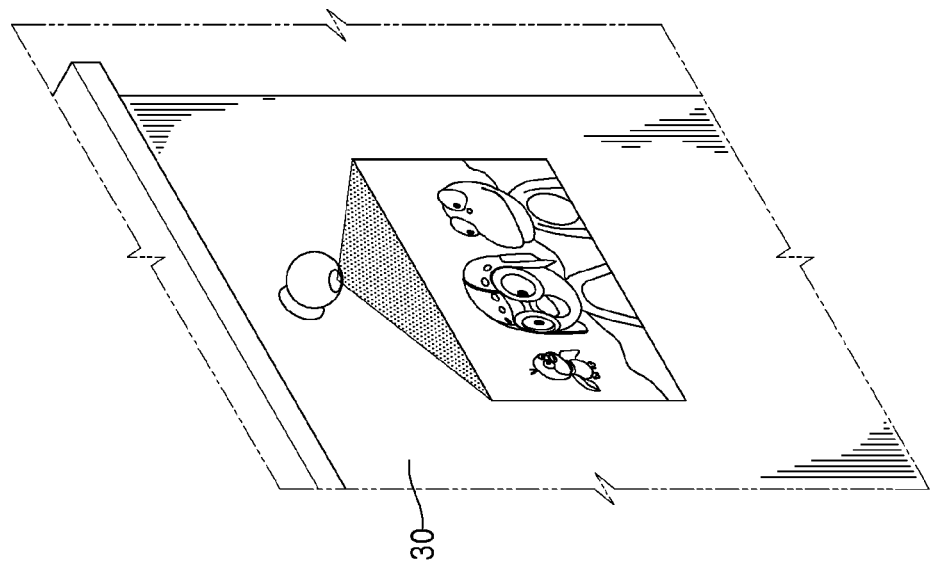

FIGS. 22A and 22B are reference diagrams showing an exemplary use of an electronic device 100 in combination with sequential control of the electronic device 100.

According to an aspect of an exemplary embodiment, the electronic device 100 may have an illumination function in addition to the projection function. For example, the electronic device 100 may be used as the illumination device (e.g., a wall-mounted light fixture) the electronic device 100 is not being used to project an image.

If the electronic device includes a light emitting diode (LED) light and the electronic device 100 is attached to a wall, the electronic device 100 may be utilized as a wall light by operating the LED light as shown in FIG. 22A when the electronic device 100 is not projecting an image.

As shown in FIG. 22B, when the angle between the electronic device 100 and the attachment member is brought to 90 degrees, the electronic device 100 may operate a projector beam to project an image onto a projection surface.

A state for each stage of the electronic device 100 according to a degree of proximity when the electronic device 100 uses an illumination function in addition to an image projection function is shown in FIG. 23.

FIG. 23 shows various states for each exemplary stage of an electronic device 100 according to a degree of proximity of the electronic device 100 with a projection function and an illumination function.

As shown in FIG. 23, in stage 4, the electronic device 100 may control a communication module to send a request to reconnect to an external device. In stage 4, data transmission may be stopped, a projection module may be turned off, and also LED light may be turned off.

In stage 3, as the degree of proximity of the electronic device 100 increases, the electronic device 100 may be connected to the external device, and data transmission may be resumed by request. However, as in stage 4, the projection module may be turned off, and the LED light may be also turned off.

In stage 2, as the degree of proximity further increases, the electronic device 100 may resume supplying power to the projection module except for the optical module. In stage 2, while the electronic device 100 is reconnected to the external device, the data transmission may continue, and the LED light may be turned off.

Stage 1 indicates that the electronic device 100 may be in close proximity to the installation surface but not unfolded from the attachment member yet. Because the electronic device 100 is not unfolded from the attachment member yet, the electronic device 100 is not ready to perform projection, that is, the data transmission and reception is resumed but power is not supplied to the optical module of the projection module. However, in stage 1, the electronic device 100 may function as an illumination device. That is, the electronic device 100 may operate as an illumination device by turning the LED light on.

Stage 0 indicates that the electronic device 100 is unfolded at approximately 90 degrees from the attachment member, and the electronic device 100 is ready to perform the projection. Accordingly, in stage 0, the electronic device 100 may turn off the LED light and control a communication module to resume transmission of data and may resume supplying power to the optical module of the projection module. Accordingly, in stage 0, the electronic device 100 may be used as a projection device.

According to various embodiments, it is possible to reduce electric current unnecessarily consumed by an electronic device by controlling power of each element of the electronic device according to a degree of proximity between the electronic device and an installation surface.

According to various embodiments, it is also possible to reduce electric current unnecessarily consumed by an electronic device by controlling power of each element of the electronic device according to a degree of proximity between the electronic device and an installation surface or information regarding whether the electronic device is installed on the installation surface.

The term "module" used in various embodiments of the present disclosure may mean a unit including a combination of one or more of hardware, software, and firmware. "Module" may be interchangeably used with a term such as a unit, logic, a logical block, a component, an element, a device, or a circuit. "Module" may be a minimum unit of parts formed integrally as one piece or a part thereof. "Module" may be a minimum unit that performs one or more functions or a part of the minimum unit. "Module" may be mechanically or electronically implemented. For example, "module" according to various embodiments of the present disclosure may include at least one of an application-specific integrated circuit (ASIC) chip, field programmable gate arrays (FPGAs), and a programmable-logic device, which are well-known or to be developed, that perform certain operations.

According to various embodiments, at least a part of a device (e.g., modules or functions thereof) or a method (e.g., operations) according to various embodiments of the present disclosure may be implemented with an instruction stored in, for example, a non-transitory computer-readable storage medium in the form of a programming module. When the instruction is executed by one or more processors (e.g., the processor 110), the one or more processors may perform a function corresponding to the instruction. The non-transitory computer-readable storage medium may be, for example, the memory 130. For example, at least a part of the programming module may be implemented (e.g., executed) by the processor 110. For example, at least a part of the programming module may include at least one of a module, a program, a routine, sets of instructions, and a process to perform one or more functions.

Examples of the computer-readable recording medium include magnetic media such as a hard disk, a floppy disk, and a magnetic tape, optical media such as a compact disc read only memory (CD-ROM) and a digital video disc (DVD), magneto-optical media such as a floptical disk, and a hardware device specially configured to store and perform the program instruction, such as a ROM, a RAM, a flash memory, etc. The program command may include not only mechanical language code generated by a compiler, but also high-level language code that may be executed by a computer using an interpreter. The hardware device may be configured to operate as one or more software modules for performing operations according to various embodiments of the present disclosure or vice versa.

A module or programming module according to various embodiments of the present disclosure may include at least one of the foregoing components, or some of the foregoing components may be omitted or other components may be further included. Operations executed by a module, a programming module, or other components according to various embodiments of the present disclosure may be performed sequentially, in parallel, repetitively, or heuristically. Some operations may be executed in another order or may be omitted, or other operations may be added.

According to various embodiments, in a non-transitory computer-readable recording medium having recorded thereon commands, the commands are set such that the at least one processor performs at least one operation when the commands are executed by the at least one processor, and the at least one operation includes measuring a degree of proximity between the electronic device and the installation plane on which the electronic device is installed, and controlling at least one of the communication module and the projection module based on the measured degree of proximity. The above-described embodiments of the present disclosure are intended for purposes of illustration only in order to easily describe technical details of the present disclosure and help understanding the present disclosure, and are not intended to limit the scope of the present disclosure. While the present disclosure has been shown and described with reference to various embodiments thereof, it should be understood by those skilled in the art that various changes in form and details may be made therein without departing from the spirit and scope of the present disclosure as defined by the appended claims and their equivalents.

What is claimed is:

1. An electronic device comprising:
   a communicator configured to exchange data with an external device;
   a projector configured to project light;
   a sensor configured to, while the electronic device is detached from the installation surface, measure a degree of proximity between the electronic device and an installation surface on which the electronic device is to be installed; and
   a controller configured to control, based on the degree of proximity measured by the sensor, at least one of a connection state between the communicator and the external device, a data transmission and reception state between the communicator and the external device, and power supplied to the projector,
   wherein the controller is further configured to perform at least one of:
      a first operation of controlling at least one of the connection state and the data transmission and reception state in response to the degree of proximity being in a first range,
      a second operation of controlling power supplied to an electronic circuit included in the projector in response to the degree of proximity being in a second range greater than the first range, and
      a third operation of controlling power supplied to an optical module included in the projector in response to the degree of proximity being in a third range greater than the first range, and
   wherein, while the electronic device approaches the installation surface, the controller is further configured to:
      control the communicator to perform at least one of (i) sending a first request to connect to the external device and (ii) sending a second request to transmit data to the external device, according to the first operation,
      control a power supply source to supply power to the electronic circuit according to the second operation, and
      control the power supply source to supply power to the optical module according to the third operation.

2. The electronic device of claim 1, wherein the installation surface is identical or parallel to a projection surface onto which the light is to be projected from the projector.

3. The electronic device of claim 1, wherein the controller is further configured to control the communicator to send the first request to connect to the external device according to the first operation when a duration that the electronic device maintains the degree of proximity within the first range is less than a threshold, and control the communicator to send the second request to transmit data to the external device when the duration that the electronic device maintains the degree of proximity within the first range is greater than or equal to the threshold.

4. The electronic device of claim 1, wherein, while the electronic device recedes from the installation surface, the controller is further configured to:
   control the power supply source to stop supplying power to the optical module included in the projector according to the third operation,
   control the power supply source to stop supplying power to the projector according to the second operation, and
   control the communicator to perform at least one of (i) sending the first request to disconnect from the external device (ii) and sending the second request to stop transmitting data to the external device, according to the first operation.

5. The electronic device of claim 4, wherein the controller is further configured to control the communicator to send the second request to stop transmitting data to the external device according to the first operation when a duration that the electronic device maintains the degree of proximity within the first range is less than a threshold, and control the communicator to send the first request to disconnect from the external device when the duration that the electronic device maintains the degree of proximity within the first range is greater than or equal to the threshold.

6. The electronic device of claim 1, further comprising another sensor configured to measure whether the electronic device is installed on the installation surface, wherein,
   the controller is further configured to control at least one of the communicator and the projector based on at least one of (i) the degree of proximity which is measured by the sensor and (ii) information regarding whether the electronic device is installed on the installation surface, the information being measured by the another sensor.

7. The electronic device of claim 6, wherein the controller is further configured to control at least one of (i) the connection state between the communicator and the external device, (ii) the data transmission and reception state between the communicator and the external device, and (iii) the power supplied to the optical module, based on at least one of the degree of proximity and the information regarding whether the electronic device is installed on the installation surface.

8. The electronic device of claim 6, wherein the controller is further configured to:

perform the first operation of controlling the connection state and/or controlling the data transmission and reception state, in response to the degree of proximity being within the first range and in response to a duration for which the electronic device maintains the degree of proximity within the first range, and perform the third operation of controlling power supplied to the optical module included in the projector in response to the degree of proximity being in the third range and in response to the information regarding whether the electronic device is installed on the installation surface.

9. The electronic device of claim 6, wherein the information regarding whether the electronic device is installed on the installation surface indicates whether the electronic device is at least one of (i) attached to the installation surface, (ii) connected to the installation surface, and (iii) installed at a structure for positioning the electronic device on the installation surface.

10. The electronic device of claim 1, further comprising another sensor configured to measure an angle between the electronic device and an attachment member of the electronic device, the attachment member securing the electronic device to the installation surface, wherein the controller is further configured to control at least one of the communicator and the projector based on at least one of the degree of proximity measured by the sensor and the angle measured by the another sensor.

11. An operating method of an electronic device, the operating method comprising:

measuring, while the electronic device is detached from an installation surface, a degree of proximity between the electronic device and the installation surface on which the electronic device is to be installed; and based on the degree of proximity measured by a sensor, controlling at least one of a connection state between the electronic device and an external device, a data transmission and reception state between the electronic device and the external device, and power supplied to a projector of the electronic device, wherein the installation surface is identical or parallel to a projection surface onto which light is to be projected from the projection, and wherein the controlling further comprises:
a first operation of controlling at least one of the connection state and the data transmission and reception state in response to the degree of proximity being in a first range;
a second operation of controlling power supplied to an electronic circuit included in the projector in response to the degree of proximity being in a second range greater than the first range; and
a third operation of controlling power supplied to an optical module included in the projector in response to the degree of proximity being in a third range greater than the second range.

12. The operating method of claim 11, wherein, while the electronic device approaches the installation surface, the controlling further comprises:

connecting to the external device and/or transmitting data to the external device according to the first operation;

supplying power to the electronic circuit of the projector according to the second operation; and supplying power to the optical module of the projector according to the third operation.

* * * * *